(12) United States Patent
Case et al.

(10) Patent No.: US 6,590,658 B2
(45) Date of Patent: Jul. 8, 2003

(54) OPTICAL ALIGNMENT SYSTEM

(75) Inventors: Steven K. Case, St. Louis Park, MN (US); Gregory S. Mowry, Burnsville, MN (US); Timothy A. Skunes, Mahtomedi, MN (US); Patrick J. Garfield, Mahtomedi, MN (US); John T. McElreath, Mahtomedi, MN (US)

(73) Assignee: CyberOptics Corporation, Golden Valley, MN (US)

( * ) Notice: Subject to any disclaimer, the term of this patent is extended or adjusted under 35 U.S.C. 154(b) by 112 days.

(21) Appl. No.: 09/789,317

(22) Filed: Feb. 20, 2001

(65) Prior Publication Data

US 2002/0113969 A1 Aug. 22, 2002

(51) Int. Cl.$^7$ ............................................. G01B 11/00
(52) U.S. Cl. ..................... 356/401; 356/400; 356/153; 250/548
(58) Field of Search ................. 356/400, 401, 356/153; 250/548; 385/49, 50, 89, 14

(56) References Cited

U.S. PATENT DOCUMENTS

| | | | |
|---|---|---|---|
| 4,720,163 A | 1/1988 | Goodwin et al. | 350/96.2 |
| 4,854,667 A | * 8/1989 | Ebata et al. | 385/134 |
| 5,216,729 A | 6/1993 | Berger et al. | 385/31 |
| 5,383,118 A | * 1/1995 | Nguyen | 356/388 |
| 5,450,508 A | 9/1995 | Decusatis et al. | 385/25 |
| 5,570,184 A | 10/1996 | Armington et al. | 356/375 |
| 5,677,973 A | * 10/1997 | Yuhara et al. | 385/90 |
| 5,745,624 A | 4/1998 | Chan et al. | 385/91 |
| 5,894,657 A | 4/1999 | Kanayama et al. | 29/740 |
| 5,916,458 A | 6/1999 | Komoriya et al. | 219/121.63 |
| 6,148,511 A | 11/2000 | Taguchi | 29/834 |
| 6,164,837 A | 12/2000 | Haake et al. | 385/90 |

OTHER PUBLICATIONS

Article from Web Site entitled "The Photonics Program and the Engineering Research Division at LLNL are Automating the Packaging of Optoelectronic Devices to Lower Costs", 3 pages, downloaded Oct. 29, 2000.
Article from Web Site entitled "Automated Optoelectronic Packaging", 2 pages, downloaded Feb. 5, 2001.
Article from Web Site entitled Micro Assembly Automation, 3 pages., downloaded Feb. 5, 2001.

* cited by examiner

Primary Examiner—Michael G. Lee
Assistant Examiner—Steven S. Paik
(74) Attorney, Agent, or Firm—Westman, Champlin & Kelly, P.A.

(57) ABSTRACT

An optical alignment system is provided for aligning an optical module of the type which is suitable for use in an optical device. The system includes a reference base having a registration feature that aligns with a registration feature of the optical module. An optical sensor senses an optical characteristic of the optical element and optical element manipulator moves the optical element relative to the registration features of the optical module. A controller operates the optical element manipulator.

45 Claims, 18 Drawing Sheets

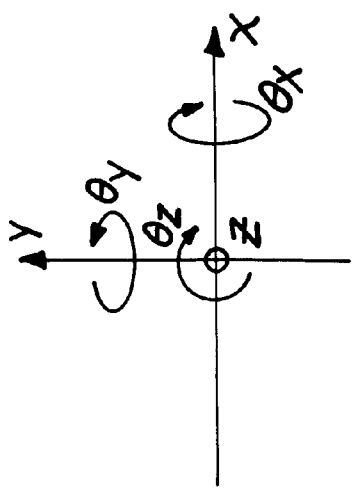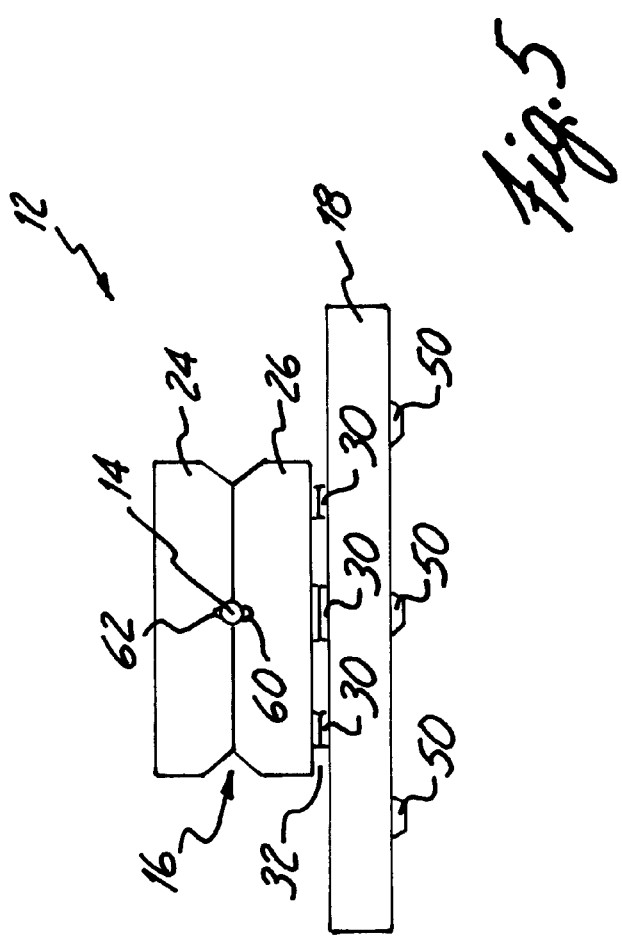
Fig. 5

OPTICAL ALIGNMENT SYSTEM

This application is related to co-pending application Ser. No. 09/789,125, filed Feb. 20, 2001 and entitled "OPTICAL MODULE"; application Ser. No. 09/789,185, filed Feb. 20, 2001 and entitled "OPTICAL MODULE WITH SOLDER BOND"; and application Ser. No. 09/789,124, filed Feb. 20, 2001 and entitled "OPTICAL DEVICE" which are incorporated by reference in their entirety.

BACKGROUND OF THE INVENTION

The present invention relates to aligning optical components used in fabricating optical devices. More specifically, the present invention relates to a system for prealigning an optical module which carries an optical component.

Optical devices are being increasingly used in various industries and technologies in order to provide high speed data transfer. In many applications there is a transition or an incorporation of optical devices where previously only electrical devices were employed. An optical device typically consists of a number of components which must be precisely assembled and aligned for the device to operate and function efficiently.

Historically, optical devices such as those used in fiber optic telecommunications, data storage and retrieval, optical inspection, etc. have had little commonality in packaging and assembly methods. This limits the general applicability of automation equipment for automating the manufacture of these devices since there is such a disparity in the device designs. To affect high volume automated manufacturing of such devices, parts of each individual manufacturing line have to be custom-designed.

In contrast, industries such as printed circuit board manufacturing and semiconductor manufacturing have both evolved to have common design rules and packaging methods. This allows the same piece of automation equipment to be applied to a multitude of designs. Using printed circuits as an example, diverse applications ranging from computer motherboards to cellular telephones may be designed from relatively the same set of fundamental building blocks. These building blocks include printed circuit boards, integrated circuit chips, discrete capacitors, and so forth. Furthermore, the same automation equipment, such as a pick and place machine, is adaptable to the assembly of each of these devices because they use common components and design rules.

Further complications arise in automated assembly of optical devices. Such assembly is complicated because of the precise mechanical alignment requirements of optical components. This adds to problems which arise due to design variations. The problem arises from the fact that many optical component properties cannot be economically controlled to exacting tolerances. Examples of these properties include the fiber core concentricity with respect to the cladding, the location of the optical axis of a lens with respect to its outside mechanical dimensions, the back focal position of a lens, the spectral characteristics of a thin-film interference filter, etc. Even if the mechanical mounting of each optical element were such that each element was located in its exact theoretical design position, due to the tolerances listed above, the performance specifications of the optical device may not be met.

To appreciate the exacting alignment requirements of high performance optical devices, consider the simple example of aligning two single mode optical fibers. In this example, the following mechanical alignments are required to ensure adequate light coupling from one fiber to the other: the angle of the fibers with respect to each other, the transverse alignment (perpendicular to the light propagation direction) and the longitudinal alignment (parallel to the light propagation direction).

Typical single mode optical fibers used in telecommunications for the 1.3 $\mu$m to 1.6 $\mu$m wavelength range have an effective core diameter of about 9 microns and an outside cladding dimension of 125 microns. The typical tolerance for the concentricity of the core to the outside diameter of the cladding is 1 micron. Assuming the outside claddings of the two fibers were perfectly aligned such that there was no angular or longitudinal misalignment, the cores may still be transversely misaligned by as much as 2 microns. This misalignment would give a theoretical coupling loss of about 14 percent or 0.65 dB. This loss is unacceptable in many applications. Techniques using active alignment, such as that shown in U.S. Pat. No. 5,745,624, entitled "AUTOMATIC ALIGNMENT AND LOCKING METHOD AND APPARATUS FOR FIBER OPTICAL MODULE MANUFACTURING", issued Apr. 28, 1998 to Chan et al., can then be employed to improve the coupling efficiency. Other example alignment techniques are shown in application Ser. No. 09/789,125, filed Feb. 20, 2001 and entitled "OPTICAL MODULE"; application Ser. No. 09/789,185, filed Feb. 20, 2001 and entitled "OPTICAL MODULE WITH SOLDER BOND"; and application Ser. No. 09/789, 124, filed Feb. 20, 2001 and entitled "OPTICAL DEVICE".

In addition to providing an optical module which addresses some of the issues mentioned above, it would also be desirable to provide a system capable of aligning such an optical module.

SUMMARY OF THE INVENTION

In one example aspect, an optical alignment system is provided for aligning an optical module of the type which is suitable for use in an optical device. The system includes a reference base having a registration feature that aligns with a registration feature of the optical module. A sensor is configured to respond to light which has interacted with or been generated by an optical element of the optical module. An optical element manipulator moves the optical element relative to the registration features of the optical module.

BRIEF DESCRIPTION OF THE DRAWINGS

FIG. 5 is a front plan view of the optical module of FIG. 2.

DETAILED DESCRIPTION OF THE PREFERRED EMBODIMENTS

The present invention includes various aspects that reduce or eliminate many of the problems associated with the prior art. The present invention offers a system for prealigning an optical component in a standardized optical module. The optical module can be aligned to registration features with sub-micron precision mating features. Mating features on the module can be attached to matching features on a substrate. Optical devices can be easily fabricated by mounting the prealigned optical module in the optical "circuit board". The prealignment of an optical component can compensate for variations between components to thereby essentially eliminate the effects of component variability. The prealigned optical modules are well suited for automated fabrication of devices.

In a general aspect, the present invention provides a system for prealigning an optical component of an optical module. The optical component can be pre-aligned to a desired spacial reference and orientation by adjusting the optical component in the optical module prior to fixing their relative positions. This can be used to provide general component pre-alignment as well as compensate for the variations which can arise between optical components. In one example, an initial alignment is used to place the optical component followed by a secondary alignment. The secondary alignment uses light which has interacted in some manner with the optical component. The secondary alignment can consist of a coarse alignment followed by a fine alignment. This technique can be used to increase the speed of assembling and aligning an optical module. The following description sets forth a number of specific examples, however, in various aspects, the present invention is not limited to the specific configurations, components or techniques set forth herein.

Figure 1:
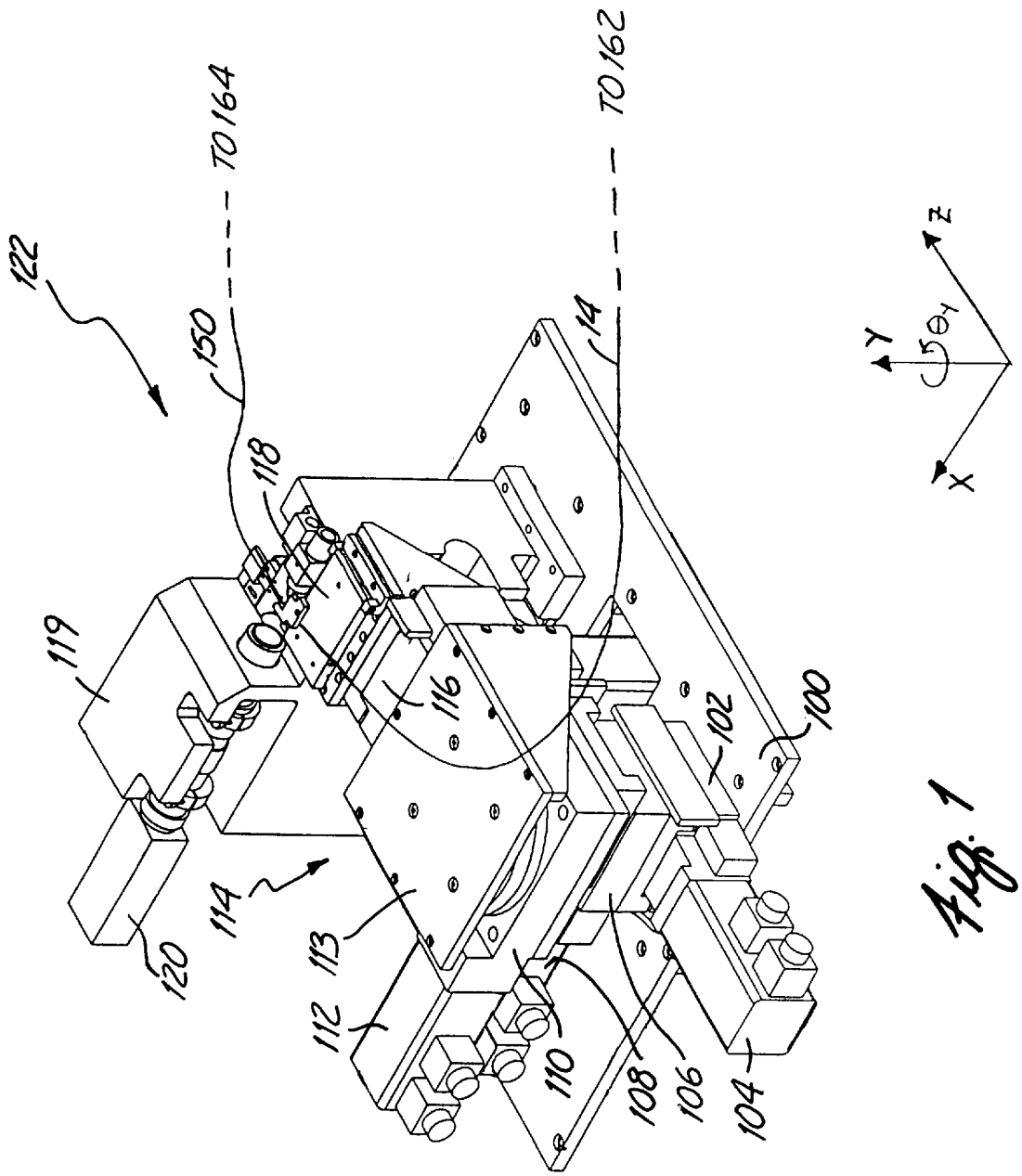
FIG. 1 is a perspective view of an alignment system for aligning an optical module.

FIG. 1 shows a portion of alignment system 122 for aligning an optical module. The optical module contains an optical element such as a fiber. Alignment system 122 is designed to align the optical element to a fixed spatial location with respect to positional registration features of the optical module.

Four axes of precision motion control for aligning an optical module are shown in FIG. 1. More or less axes may be used depending on the application and the alignment tolerances. FIG. 1 shows Z-axis linear stage 102 mounted to plate 100. Linear stage 102 is driven by DC servo motor 104. X-axis linear stage 106 is mounted on top of linear stage 102. Linear stage 106 is driven by DC servo motor 108. Rotary stage 110 is mounted on top of linear stage 106 and is driven by DC servo motor 112. Stage adapter bracket 113 allows Y-axis linear stage 116 to be attached to rotary stage 110. Each linear stage 102, 106, and 116 has integral encoder feedback. Preferably, these encoders have a resolution of 50 nanometers. Rotary stage 110 has a rotary shaft encoder with a preferable resolution of 0.002 degrees. Although DC servo motors are shown in FIG. 1, other types of motors such as stepper motors may be used. Also, the linear stages may be replaced with piezoelectric driven motion assemblies. In general, the types of linear and rotary stages, as well as the appropriate motion accuracies and resolutions, can be tailored to the particular optical module assembly. The selected values previously described are representative of specifications appropriate to an optical fiber module.

Camera 120, attached to mount 119, is shown in FIG. 1 and is used as a feedback mechanism to coarsely align the optical module prior to final alignment steps. Also shown in FIG. 1 is optical module loading arm 118. Stage assembly 114 is the combination of linear stages 102, 106, and 116, rotary stage 110, and stage adapter bracket 113. Fiber 14 is coupled to power meter 162 discussed below in connection with FIG. 17. A reference fiber is used during alignment and is coupled to laser 164 shown in FIG. 17.

Figure 2:
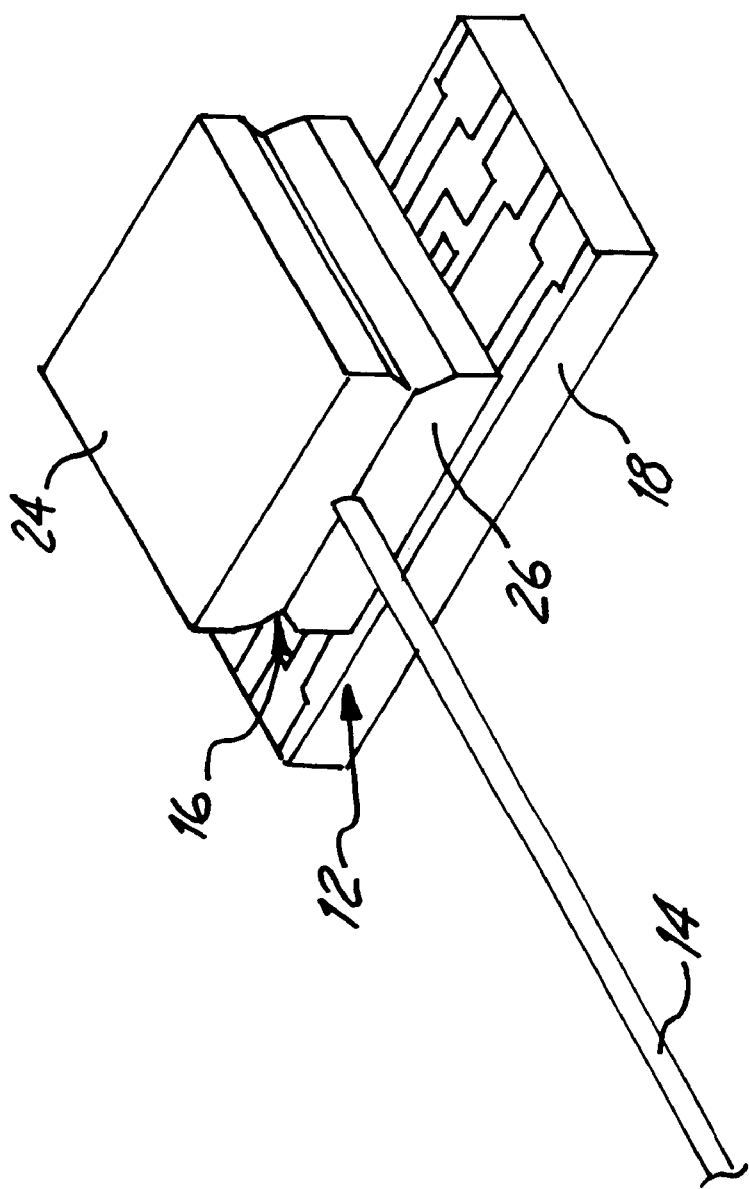
FIG. 2 is a perspective view of an optical module.

FIG. 2 is a perspective view of an example optical module 12 to be aligned by alignment system 112. Optical module 12 A3 is shown configured to accept optical fiber 14. Fiber 14 is mounted to optical component mount 16. Optical component mount 16 is positioned and oriented to achieve a desired position and orientation of optical fiber 14 relative to registration features on base mounting plate 18. One example optical module is shown and described in application Ser. No. 09/789,125, filed Feb. 20, 2001, entitled "OPTICAL MODULE".

Figure 3:
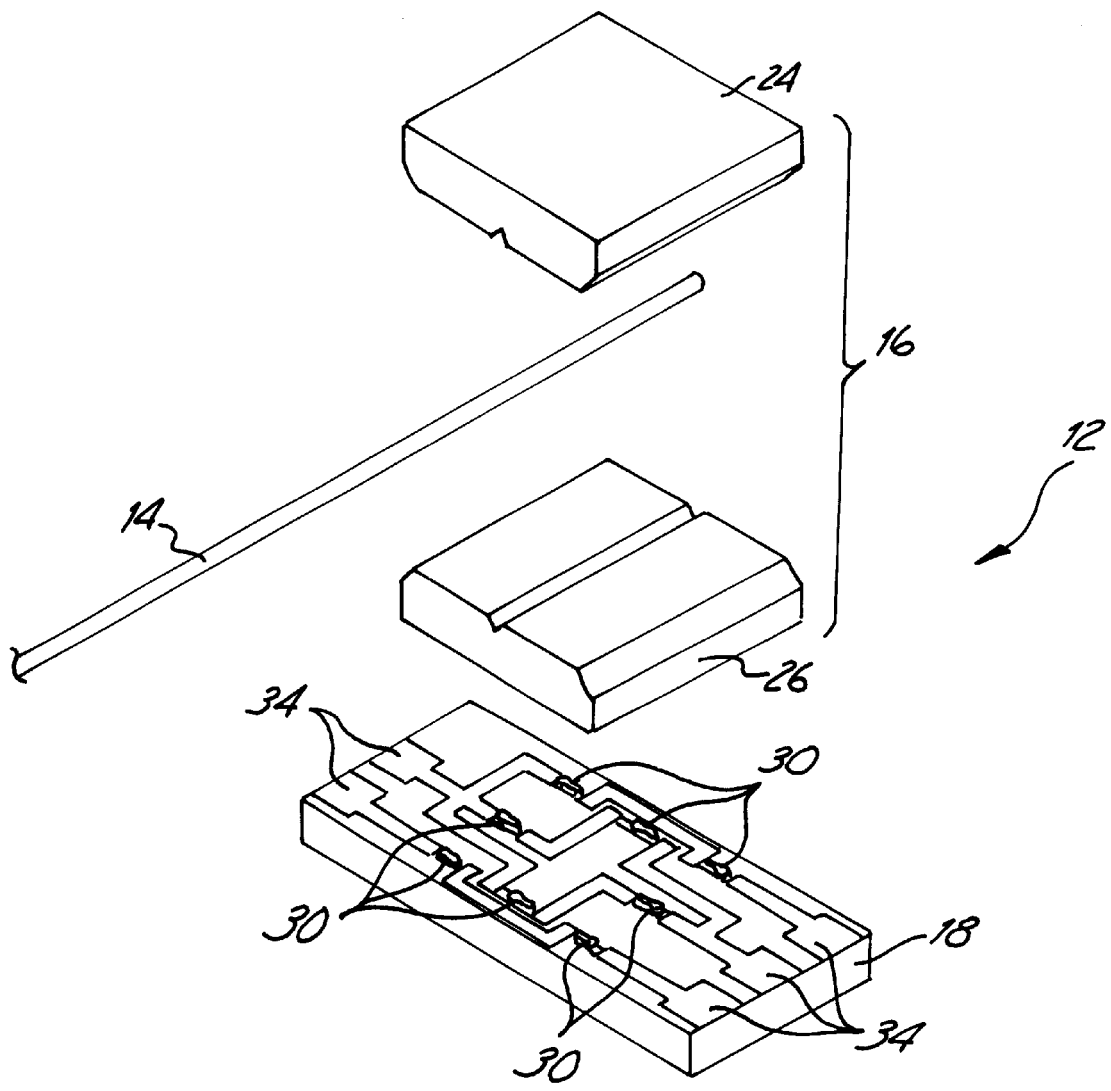
FIG. 3 is an exploded perspective view of the optical module of FIG. 2.

FIG. 3 is an exploded perspective view of optical module 12. Optical component mount 16 comprises upper component mount 24 and lower component mount 26. FIG. 3 illustrates one example mounting technique coupling optical component mount 16 to base mounting plate 18. In this example, a bonding material 30 is carried on a top surface of base mount plate 18. Material 30 preferably has at least two states. In one state, material 30 does not interfere or contact mount 16. Then, the optical component mount 16 can be positioned with up to six degrees of freedom relative to the base mounting plate 18. In another state, the material couples mounts 16 and 18 and thereby fixes the relative position therebetween. In one preferred embodiment, material 30 comprises a heat responsive (or activated) material such as solder, solder paste, or other bonding material. However, other materials such as adhesives which dry, chemically react, or are activated by other means or other attachment techniques can be used. Preferably, the attachment technique allows some relative movement between the optical component mount 16 and the base mounting plate 18 prior to fixedly attaching the two. In embodiments where a heat activated material is used, integral heating elements can be provided to heat the material 30. For example, in FIG. 3, heating elements are provided which are activated through the application of electrical energy through contact pads 34. Any appropriate bonding material and any appropriate technique of fixing the bonding material can be used. In one embodiment, a radiation source can be used to cure the bonding material.

Figure 4:
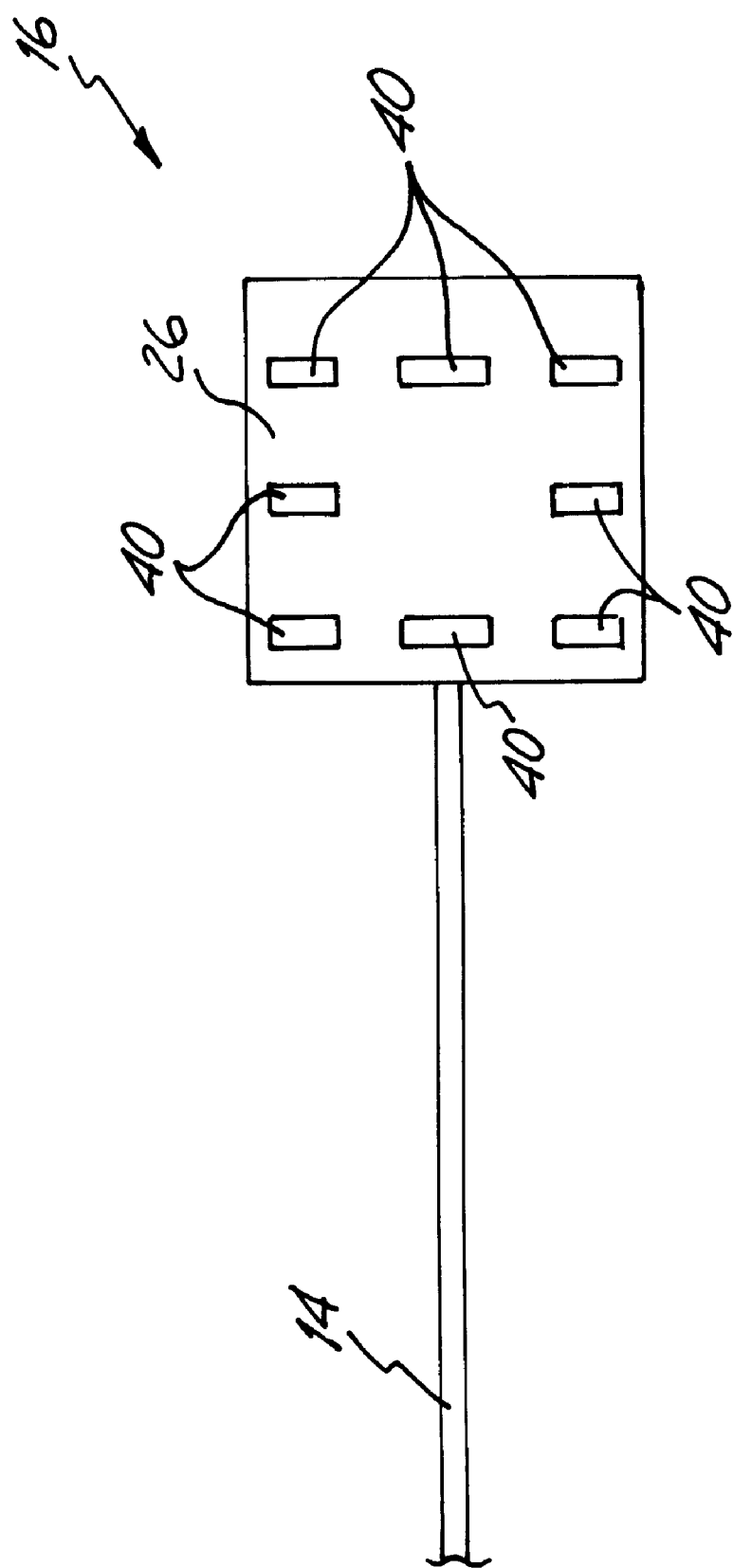
FIG. 4 is a bottom plan view of an optical component mount of the optical module shown in FIG. 2.

FIG. 4 is a bottom plan view of optical mount 16 and lower mount 26 and shows bonding pads 40 which are arranged to mate with material 30 shown in FIG. 3. Pads 40 can comprise, for example, a metal deposited on lower mount 26.

FIG. 5 is a front plan view of optical module 12 showing optical component mount 16 adjacent base mounting plate 18. In the arrangement shown in FIG. 3, material 30 is not in initial contact with optical component mount 16. As discussed below, material 30 can be activated to fill the gap 32 between mount 16 and mount 18. However, other types of material 30 can be used in which there is actual contact between mounts 16 and 18 or material 30 fills gap 32 prior to bonding. FIG. 5 also illustrates example registration features 50. In the embodiment of FIG. 5, each registration feature 50 is a protrusion that is configured to mate with reference registration features as discussed below.

FIG. 5 also shows a component registration feature 60 formed in lower component mount 26 and a component registration feature 62 in upper component mount 24. In the embodiment of FIG. 5, component registration features 60 and 62 comprise V-grooves that are configured to receive optical fiber 14. The optical fiber 14 can be coupled to the optical component mount using, for example, an adhesive or solder. Optical fiber 14 is preferably fixed to component mount 16 to maintain alignment relative to registration features 50.

Figure 6:
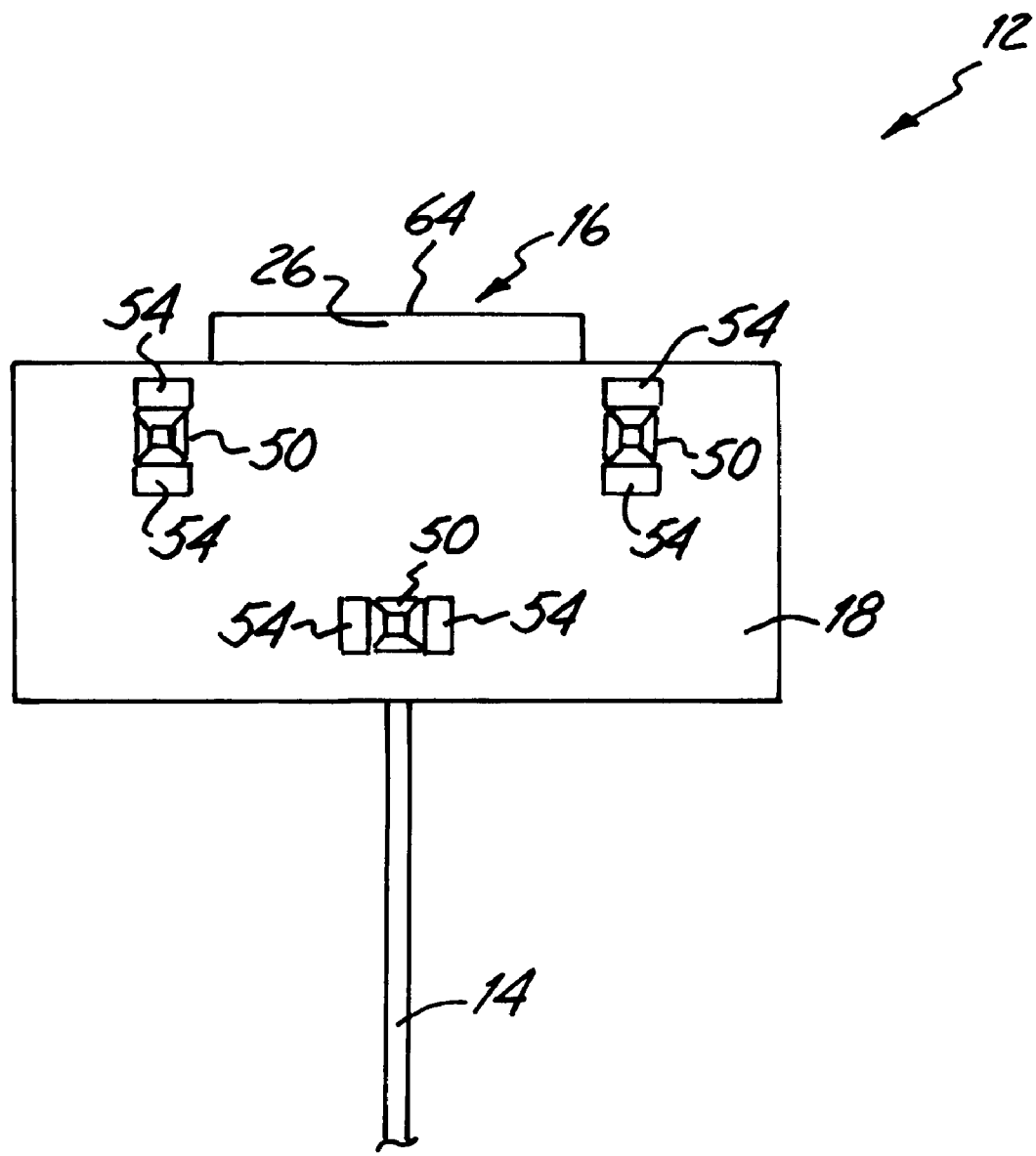
FIG. 6 is a bottom plan view of the optical module of FIG. 2.

FIG. 6 is a bottom plan view of optical module 12 which shows base mounting plate 18 and a portion of lower optical component mount 26 of optical component mount 16. Pads 54 can be provided to strengthen a bond between mount 18 and an optical circuit board. Registration features 50 are also clearly shown in this view. Registration features 50 are configured to couple to an "optical circuit board" such that multiple optical modules can be coupled together to form optical devices. This is described in more detail in co-pending application Ser. No. 09/789,124, entitled "OPTICAL DEVICE", filed Feb. 20, 2001.

Figure 7:
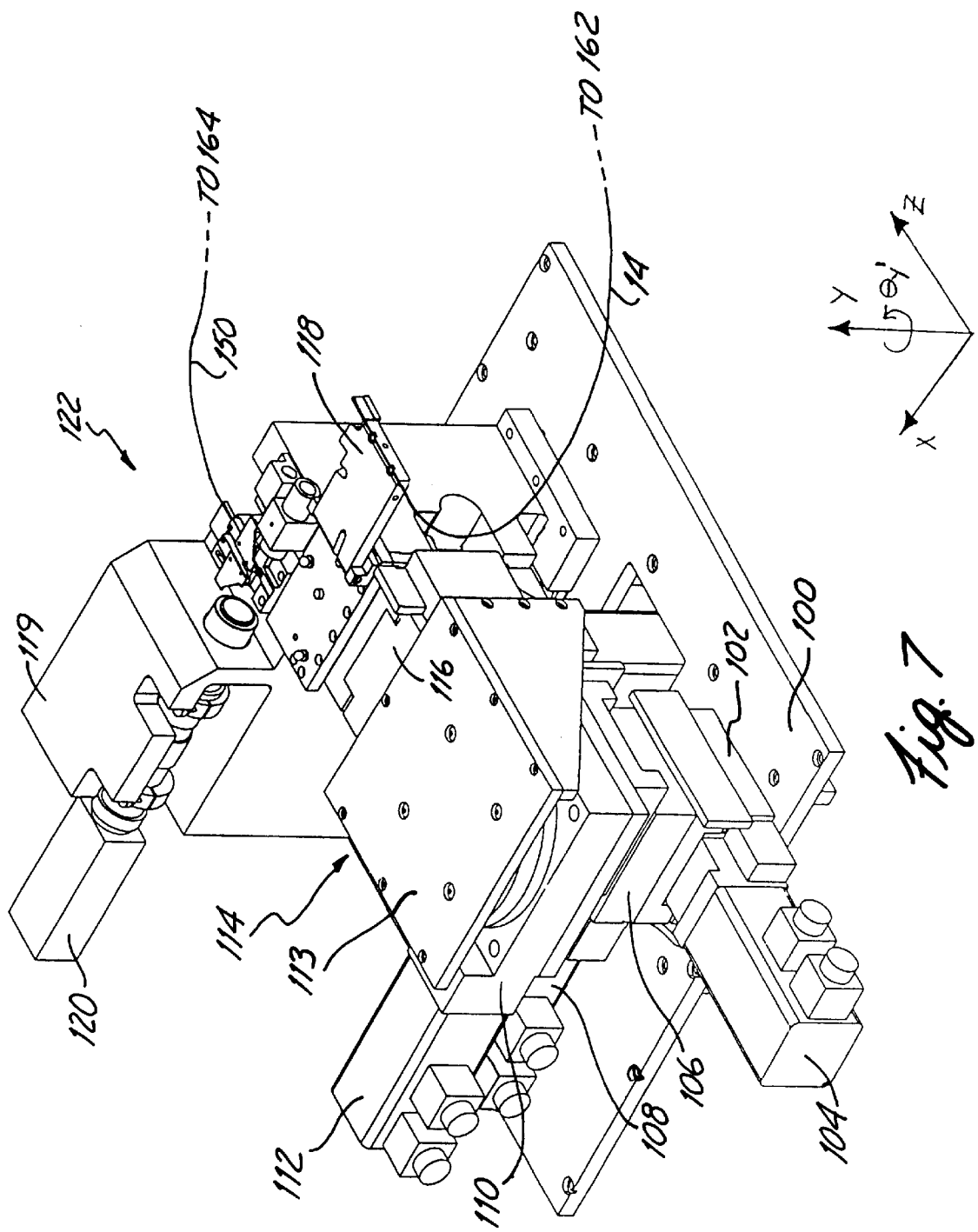
FIG. 7 is a perspective view of the optical alignment system of FIG. 1.
Figure 13:
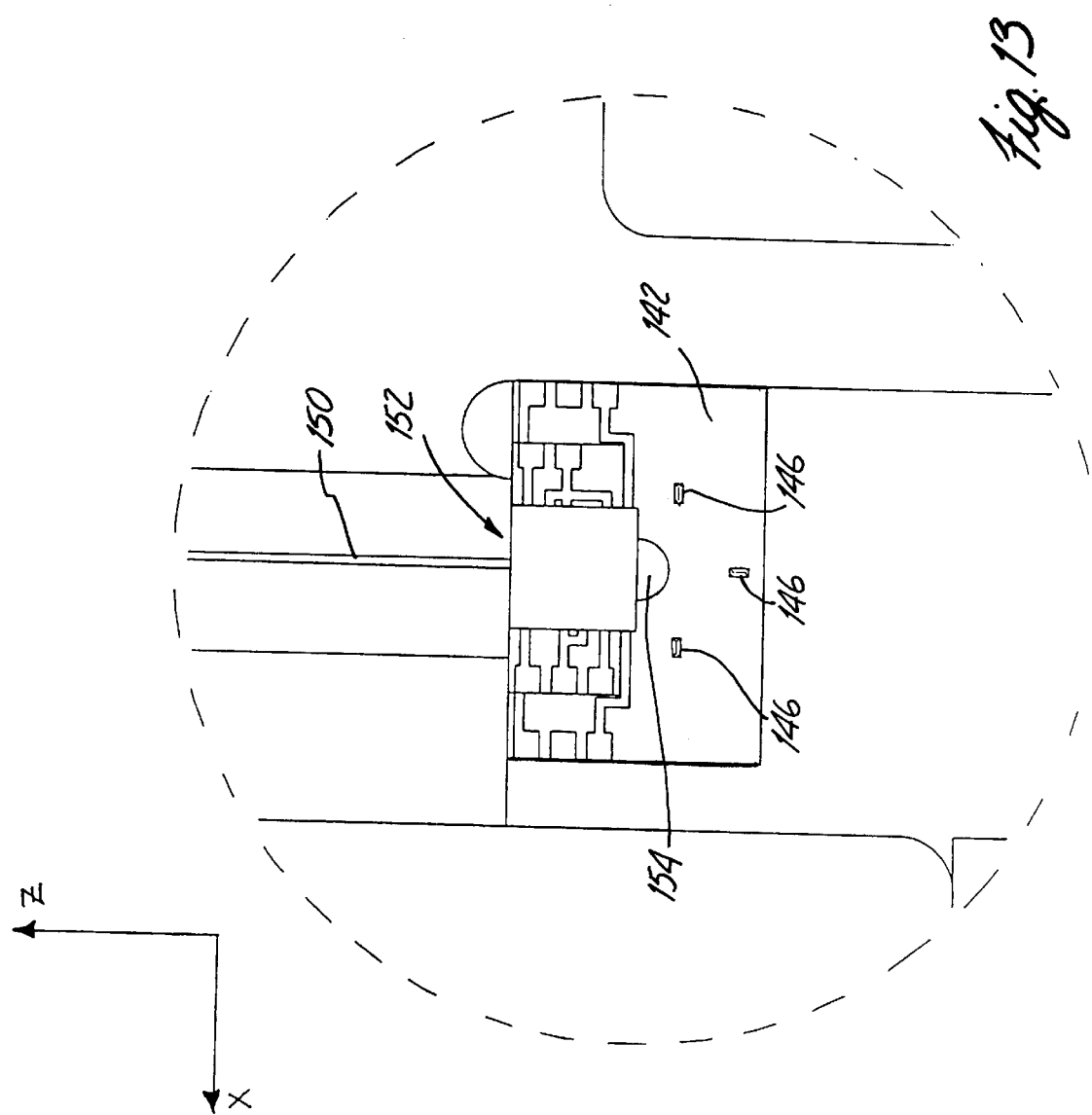
FIG. 13 is a top plan view showing an optical reference plate of the optical alignment system.

Alignment system 112 is designed to align the core of optical fiber 14 to with respect to the reference spatial location provided by the core of reference fiber 150 shown in FIG. 13 and the registration features 50 of optical module 12. Bearing this in mind, the description of alignment system 112 continues with FIG. 7. In FIG. 7, optical module loading arm 118 is shown in the open or "load/unload" position. Whereas, in FIG. 1, optical module loading arm 118 is shown in the closed or "align" position.

Figure 8:
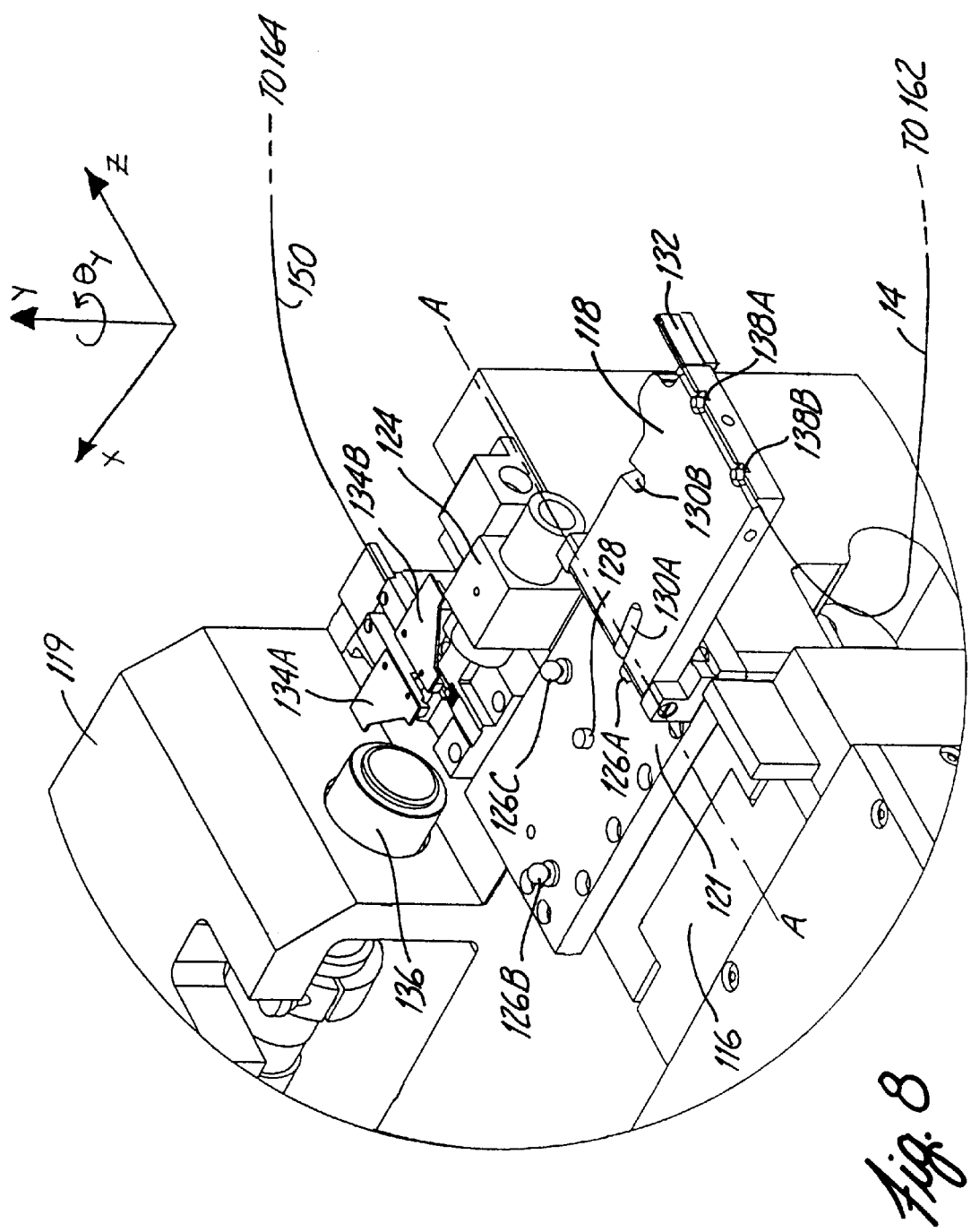
FIG. 8 is a enlarged perspective view of a portion of the optical alignment system.

FIG. 8 is a perspective view showing more detail around optical module loading arm 118. Optical module loading arm 118 is hinged about axis A—A. When optical module loading arm is in the "closed" position, as shown in FIG. 1, grooves 130A and 130B engage precision tooling balls 126B and 126B, respectively. These ensure the precise location of optical module loading arm 118. In this example, optical module loading arm 118 is made from a ferromagnetic material such as stainless steel. Magnet 128 ensures that optical module loading arm 118 is seated rigidly during the alignment steps. Loading arm acceptor plate 121 is rigidly attached to Y-axis linear stage 116 and hence to stage assembly 114. Gripper 132 is shown as an integral part of loading arm 118 and is used to hold and manipulate optical component mount 16 during the steps of alignment.

Also shown in FIG. 8 is camera lens assembly 136 used to image a side view of optical component mount 16 onto camera 120. This is described more fully in the discussion of FIG. 16. Lighting module 124 is used to provide backlight illumination to camera 120. Camera lens assembly also includes "through-the-lens" or specular illumination. FIG. 8 also shows current probe assemblies 134A and 134B that are described more fully in the discussion of FIGS. 11 and 12.

Figure 9:
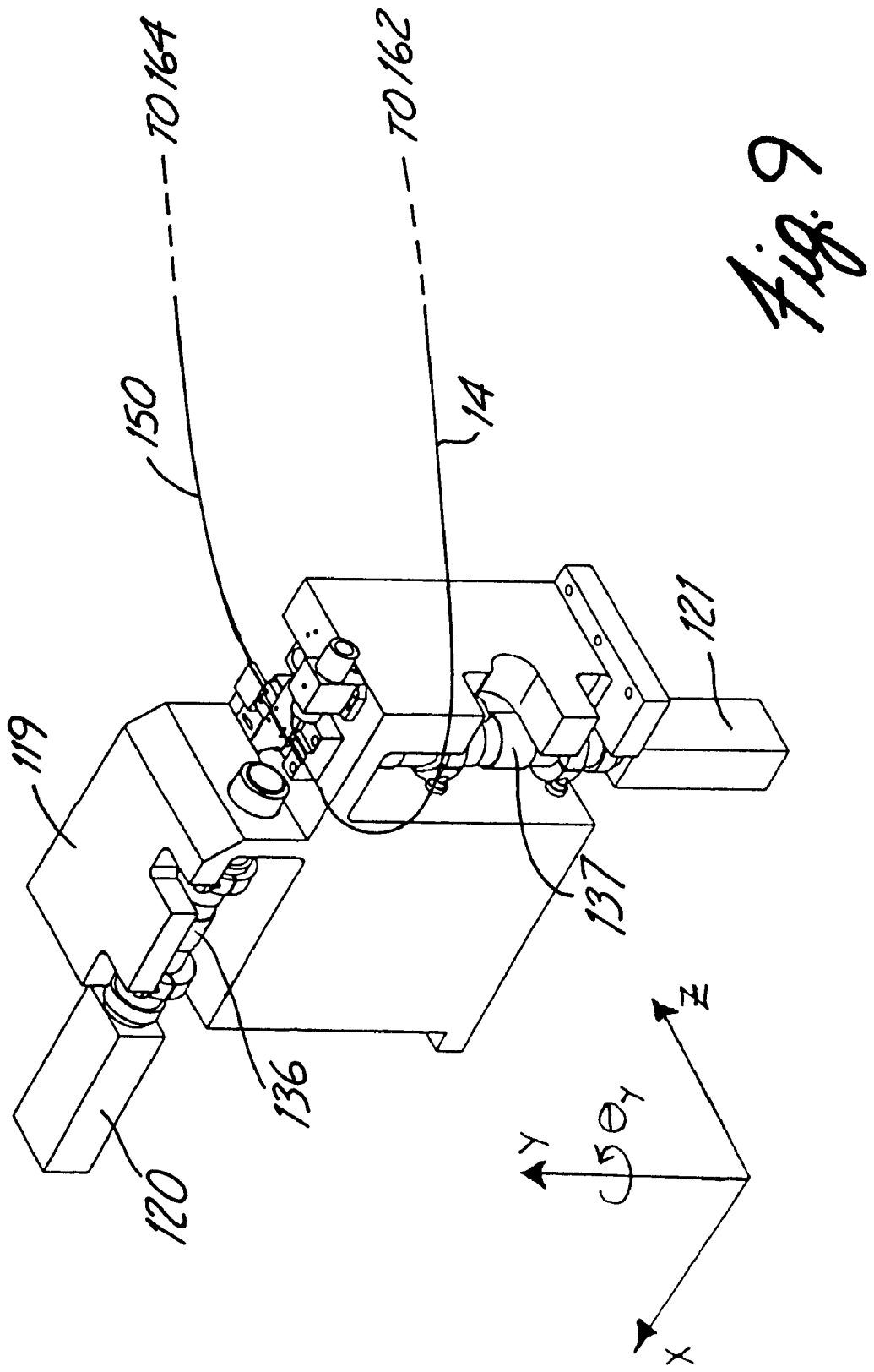
FIG. 9 is a perspective view of a portion of the optical alignment system.

FIG. 9 is a perspective view of mount 119 with stage assembly 114 removed for clarity. Lens assembly 137 provides another view of optical component mount 16 to camera 121. This image is also used as a feedback mechanism to coarsely align the optical module prior to final alignment steps. Lens assembly 137 also includes "through-the-lens" or specular illumination to provide lighting for camera 121. Camera 120 is able to obtain an image of component mount 16 in the Y-Z plane, whereas camera 121 is able to obtain an image of component mount 16 in the X-Z plane.

Figure 10:
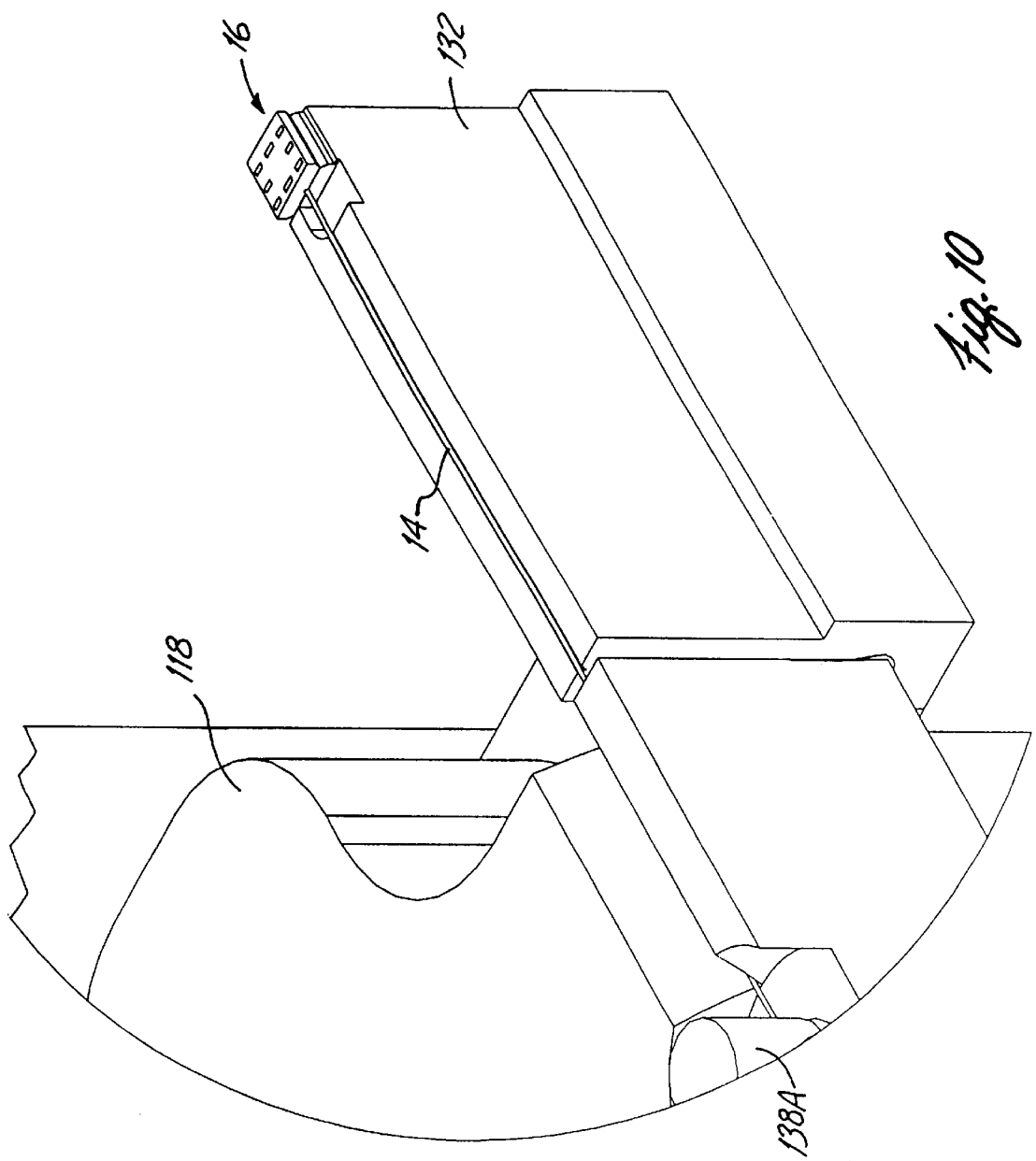
FIG. 10 is an enlarged perspective view showing a gripper of the optical alignment system.

FIG. 10 shows a close-up view of gripper 132 used to hold and manipulate component mount 16 during the alignment steps. Gripper 132 includes a vacuum port to hold component mount 16 during alignment. Magnetic plugs 138A and 138B (visible in FIG. 8) are tipped with a thin layer of compliant material so as not to damage optical fiber 14. They are designed however, to provide strain relief of fiber 14 during the alignment process.

Figure 11:
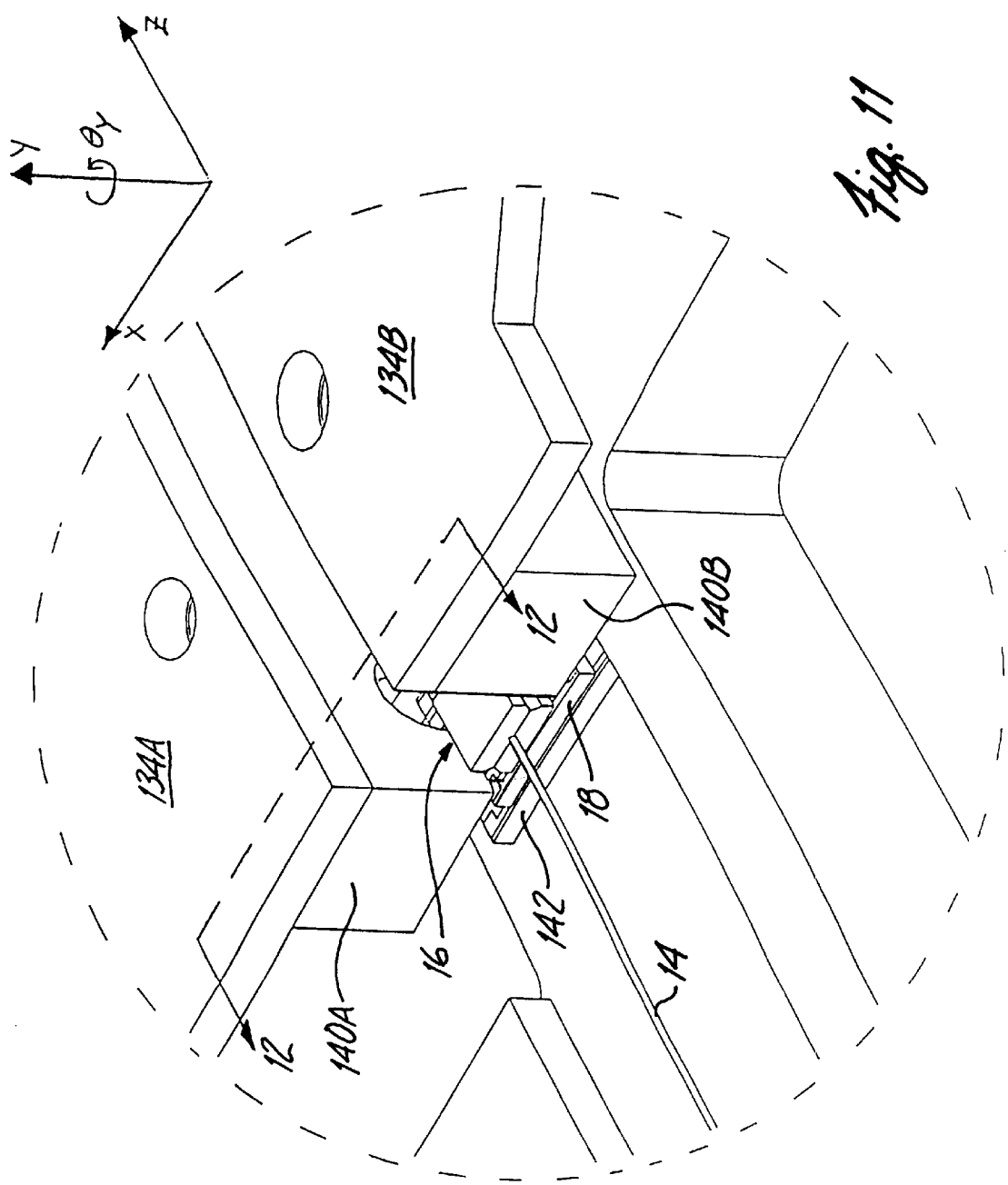
FIG. 11 is an enlarged perspective view of the optical alignment system showing positioning of an optical component mount.

FIG. 11 shows a close-up perspective view of component mount 16 positioned above base mounting plate 18. Gripper 132 was removed from this view for clarity. Base mounting plate 18 is engaged into reference plate 142 and provides a reference base and acts as a reference circuit board against which optical components can be aligned. Probe contact mounts 140A and 140B contain spring-loaded pins (two of which are shown as 144A and 144B in FIG. 12) to ensure base mounting plate 18 fully engages reference plate 142. These pins also supply electrical current to melt solder bonding material 30. It should be noted that current probe assemblies 134A and 134B may be retracted in order to place base mounting plate 18 into alignment system 122. Current probe assemblies may then be positioned as shown in FIG. 11 in order for spring-loaded pins 140 to contact pads 32 and 34 of optical mounting plate 18.

Figure 12:
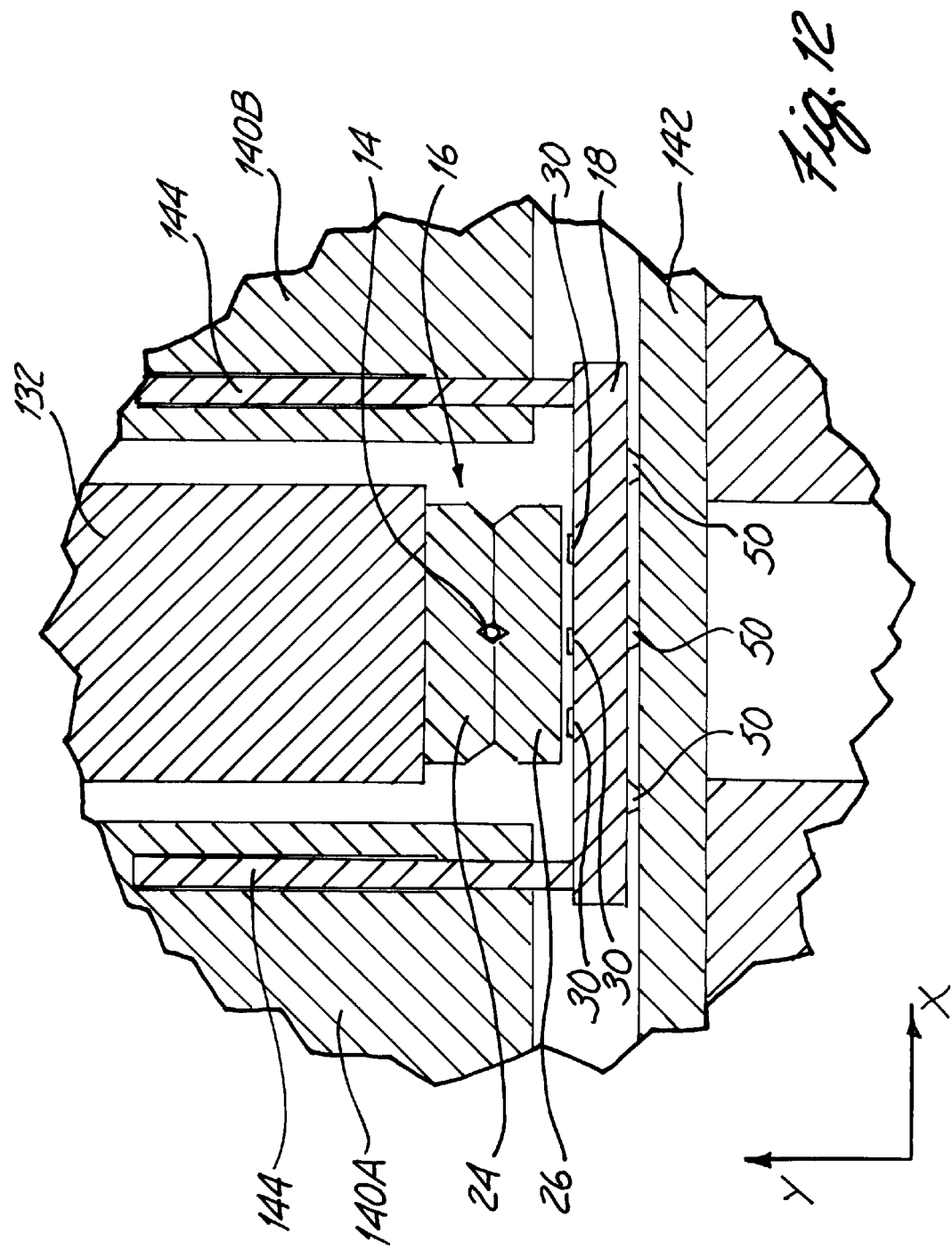
FIG. 12 is a cross-sectional view of the optical alignment system taken along the line labeled 12—12 in FIG. 11.

FIG. 12 is cross-sectional view 12—12 from FIG. 11. Gripper 132 is once again shown supporting component mount 16 during the alignment steps. The alignment steps are fully described with respect to FIGS. 17 and 18. FIG. 12 shows two of the contact pins 144 pressing base mounting plate 18 into reference plate 142. One contact pin 140 is provided for each contact pad 34 on base mounting plate 18.

FIG. 13 shows a top view of reference plate 142. Integral V-groove registration features 146 mate with registration features 50 of base mounting plate 18 and provide repeatable and substantially kinematic coupling between features 146 and 50. Aperture 154 is provided in reference plate 142 to allow camera 121 to obtain X-Z view of component mount 16. Reference fiber 150 is held by reference fiber mount 152. Reference fiber mount 152 rigidly couples the spatial location of the core of reference fiber 152 with respect to V-groove registration features 146. The optical core position of fiber 150 establishes the target alignment location of fiber 14.

Figure 14:
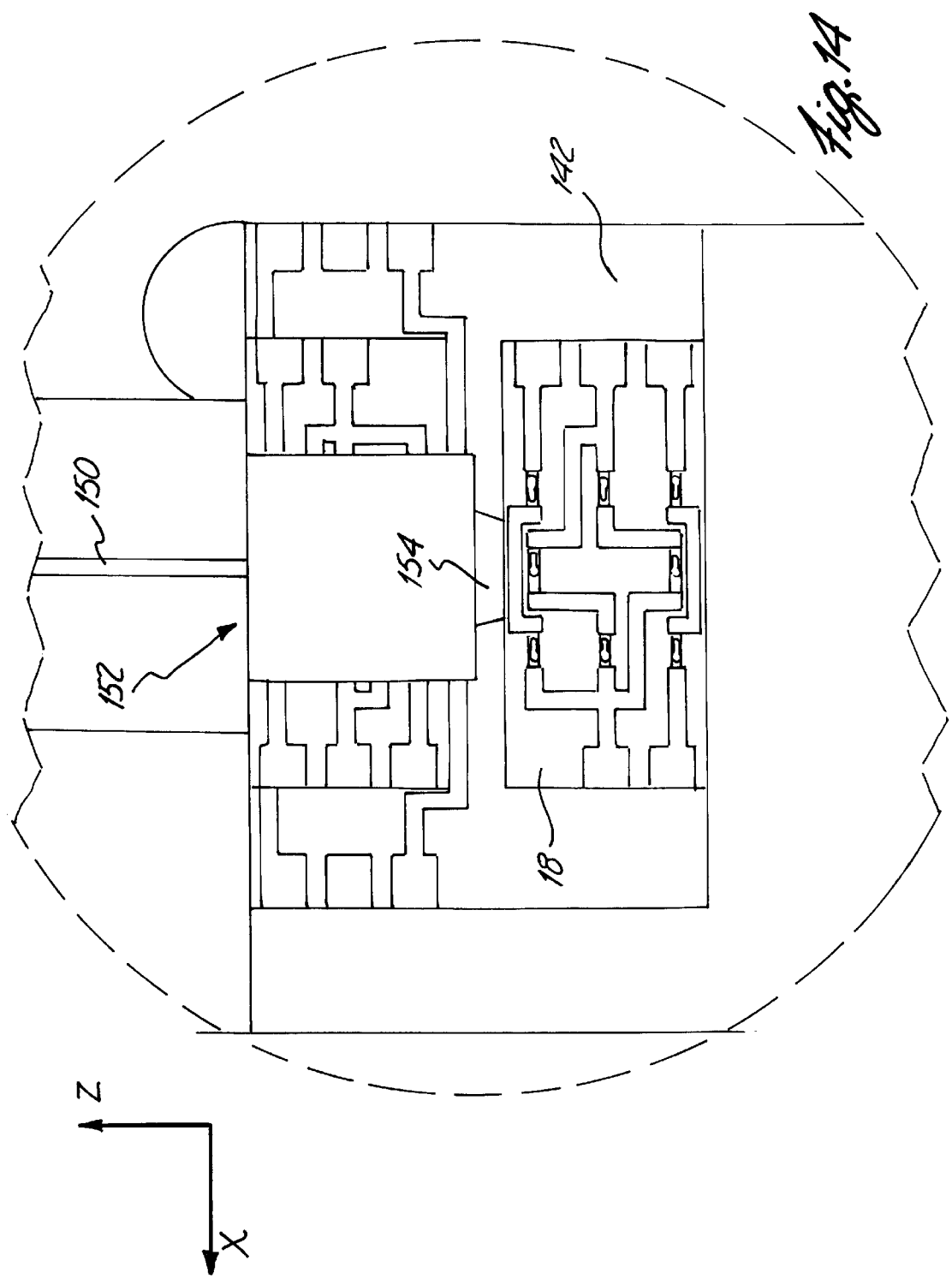
FIG. 14 is a top plan view showing a base mounting plate adjacent the optical reference plate.

FIG. 14 is similar to FIG. 13 with the addition of base mounting plate 18 registered to reference plate 142.

Figure 15:
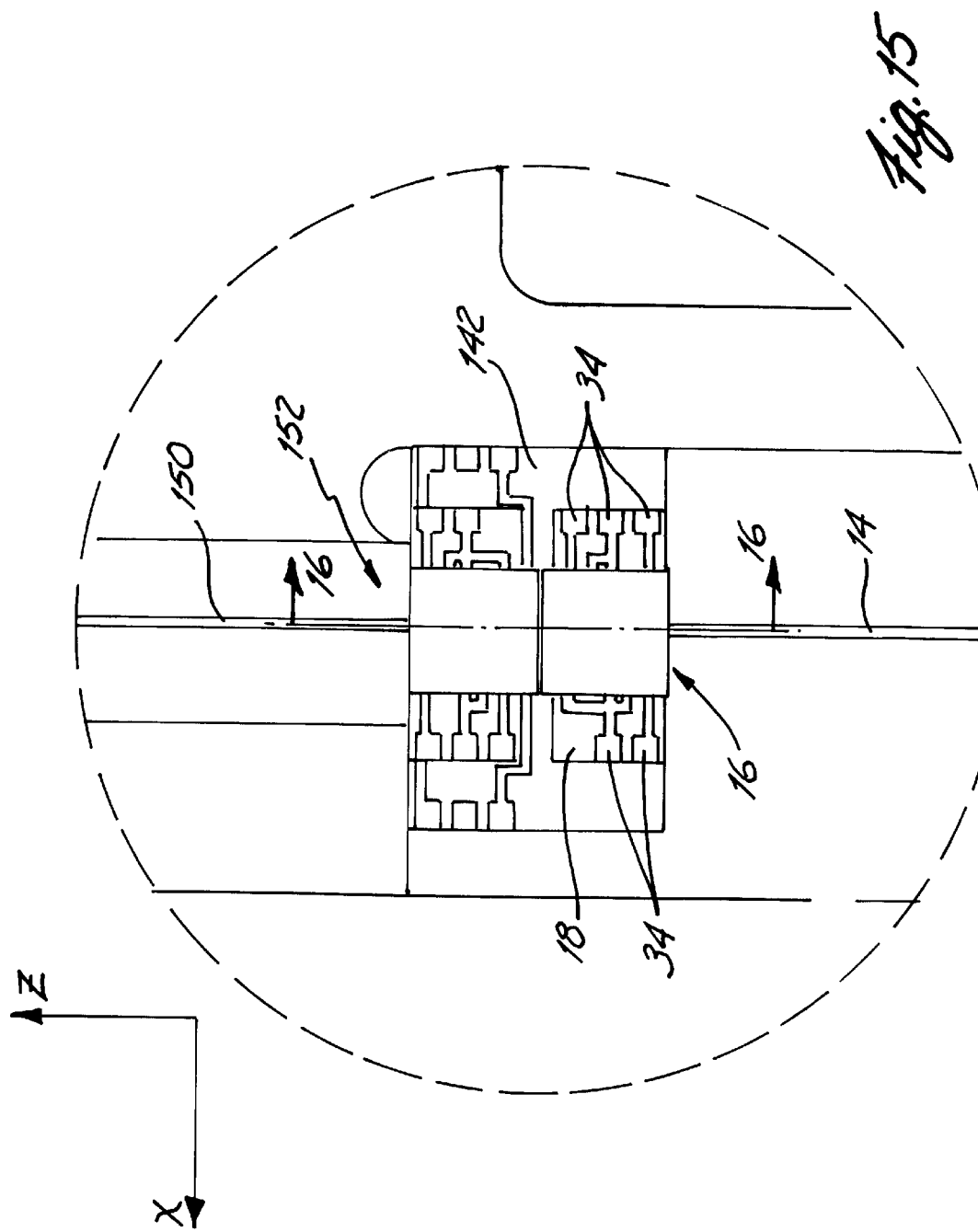
FIG. 15 is a top plan view showing the optical module adjacent the optical reference plate.

FIG. 15 is similar to FIG. 14 with the addition of component mount 16 in a position above base mounting plate 18.

Figure 16:
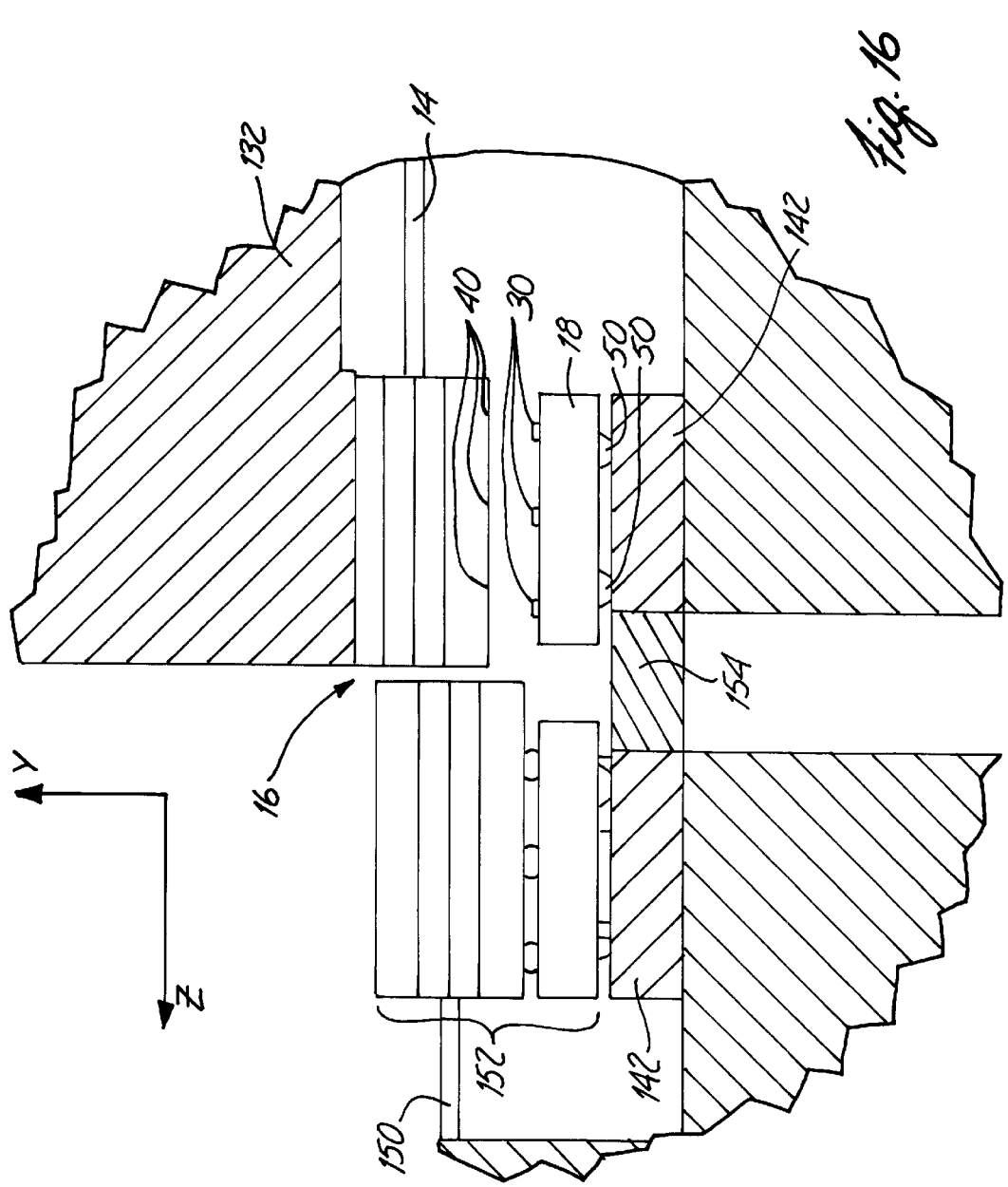
FIG. 16 is a side cross-sectional view taken along the line labeled 16—16 in FIG. 15.

FIG. 16 is a cross-sectional view 16—16 from FIG. 15 clearly showing component mount 16 being supported and manipulated by gripper 132 during the alignment process. Also shown in this view is reference fiber mount 152 and reference fiber 150. This is essentially the view that camera 120 sees. Camera 120 is able to provide an image showing the gap in the Z-direction between optical component mount 16 and reference fiber mount 152. This image will also contain information about the vertical offset in the Y-direction between optical component mount 16 and reference fiber mount 152. Controller 160, shown in FIG. 17, uses this image to calculate positional offsets in the Y and Z axes. Likewise, camera 121 provides an image to controller 160. From this image, the angular offset, $\theta_y$, and the X-axis offset are calculated by controller 160. The information provided by camera 120 and camera 121 images is used to position component 16 prior to scanning for maximum coupling of light from fiber 150 into fiber 14. This initial step of using the camera 120 and camera 121 images ensures that there is some light coupling from fiber 150 into fiber 14.

Figure 17:
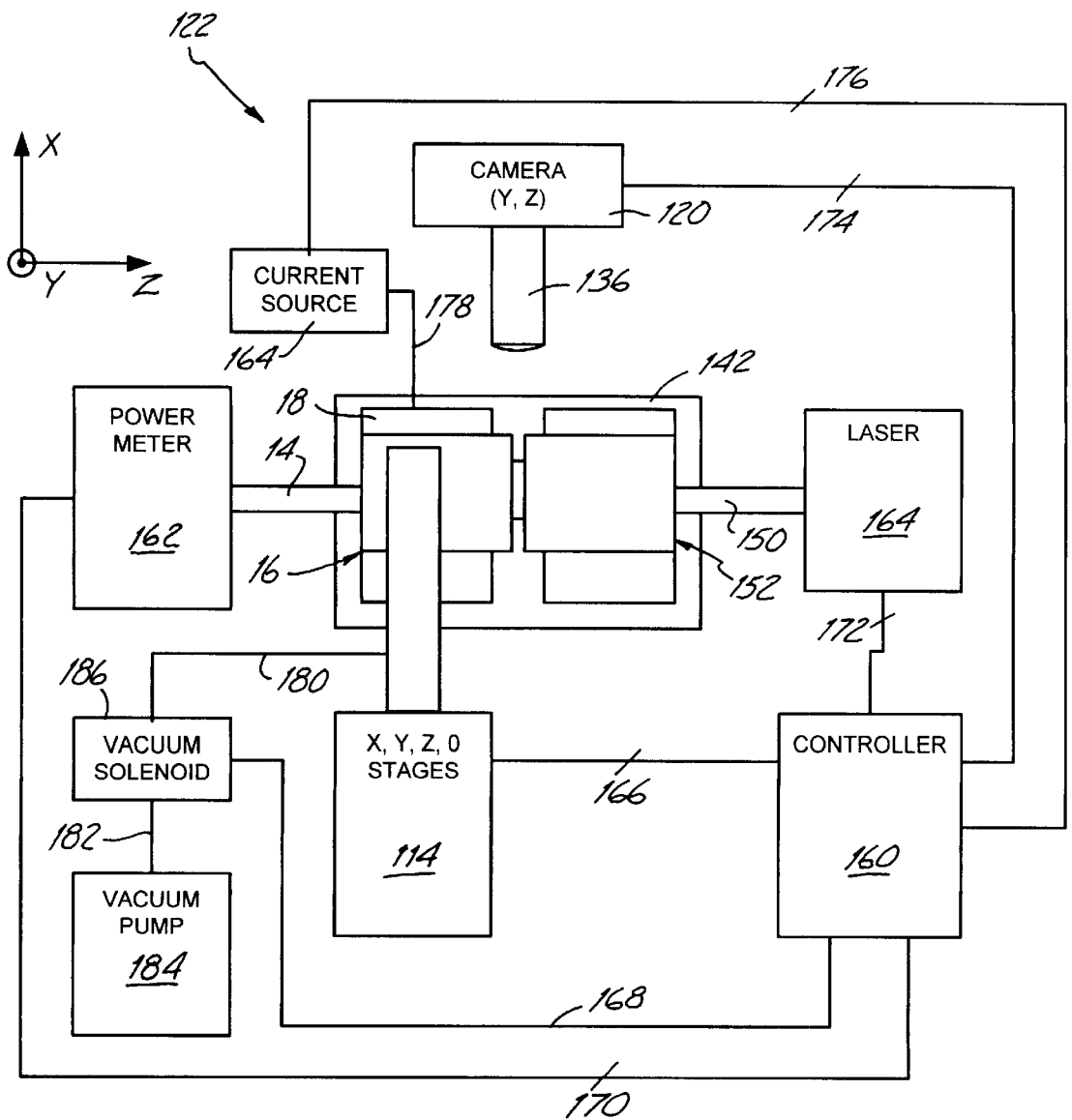
FIG. 17 is a simplified block diagram showing elements of the optical alignment system.

FIG. 17 is a block diagram of elements of alignment system 122. Light from optical source 164 shown as a laser in FIG. 17 is coupled into reference fiber 150. Stage assembly 114 manipulates fiber 14 to align it with respect to its registration features 50. Power meter 162 senses light from fiber 150 coupled into fiber 14. Fiber 14 is aligned with respect to fiber 150 when the light coupling between the two fibers is maximized.

FIG. 17 shows vacuum pump 184 for supplying vacuum to gripper 132. The vacuum for gripper 132 may be turned on and off by controller 160 using vacuum solenoid 186. Vacuum pump 184 is coupled to vacuum solenoid 186 by vacuum line 182. The output of vacuum solenoid 180 is routed to gripper 132 (not shown in this Figure) by vacuum line 180. Other attachment techniques can be used as appropriate including mechanically gripping the component. If a gripping technique is employed, the angled or beveled edges of the component mount can facilitate the gripping.

Controller 160 of FIG. 17, which may be a computer, controls and coordinates the alignment functions. Controller 160 reads encoder signals and controls the motion of stage assembly 114 over data bus 166. Controller 160 can control the level of laser 164 over data bus 172. Controller 160 sets the operating mode of power meter 162 as well as obtaining the recorded optical power present in fiber 14 over data bus 170. Controller 160 obtains images from cameras 120 and 121 (not shown) over data bus 174. Controller 160 also commands current source 164 to melt and cool solder bonding material 30 after final alignment of fiber 14 is achieved.

Figure 18:
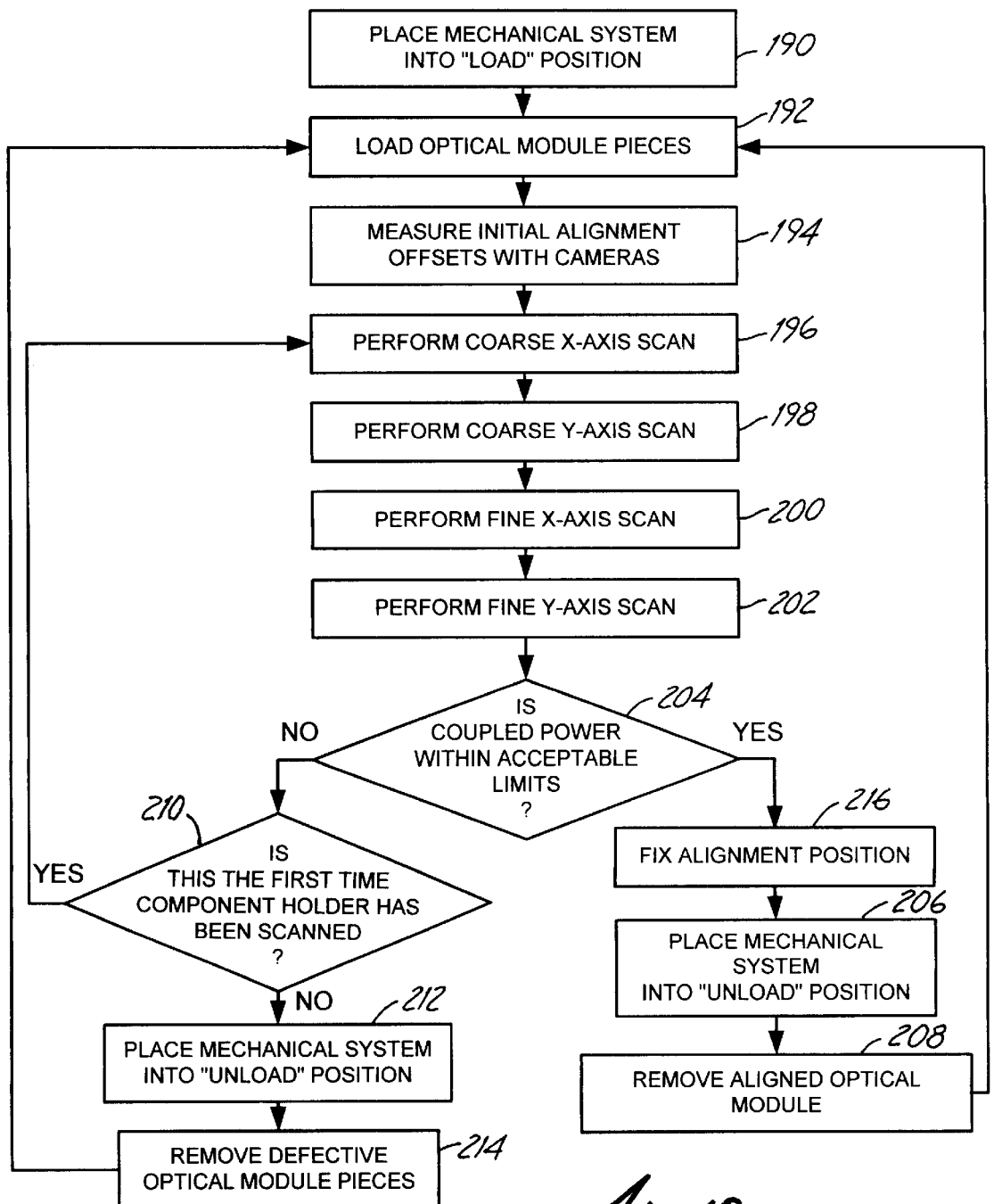
FIG. 18 is a block diagram illustrating steps in accordance with one example alignment technique of the invention.

A discussion of the alignment procedure is now given with reference to the flowchart of FIG. 18. The process begins at block 190 by placing the mechanical system into the "load" position. This involves moving stage assembly 114 to the "load/unload" position. Optical module loading arm 118 is then placed into the "load/unload" position. This is followed by retracting current probe assemblies 134A and 134B.

The process then proceeds to block 192 by loading the optical module pieces. This involves placing base mounting plate 18 onto reference plate 142. Registration features 50 are mated with V-groove registration features 146. Optical component mount 16 is then placed onto gripper 132. Magnetic plugs 138A and 138B are positioned to provide strain relief to fiber 14. Next, optical module loading arm 118 is placed into the "align" position. Finally, probe contact mounts 140A and 140B apply pressure to base mounting plate 18 through contact pins 144.

The process then proceeds to block 194 to measure the initial alignment offsets with video cameras 120 and 121. Stage assembly 114 moves component mount 16 to an intermediate alignment position. This intermediate position is chosen such that component 16 does not accidentally bump into reference fiber mount 152, but still ensures that component 16 will be in the field of view of both cameras 120 and 121. An X–Z image of component mount 16 and reference fiber mount 152 is then obtained by camera 121. The angular misalignment of component mount 16 with respect to reference fiber mount 152 is calculated by controller 160. Stage assembly 114 is then rotated in the $\theta_y$ direction to correct for the angular misalignment calculated in the previous step. Next, another X–Z image of component mount 16 and reference fiber mount 152 is obtained. Also, a Y–Z image of component mount 16 and reference fiber mount 152 is obtained by camera 120. Using these two images, the X, Y, and Z offsets of component mount 16 with respect to reference fiber mount 152 are calculated.

The process then proceeds to block 196 to perform a coarse X-axis scan. Stage assembly 114 preferably moves component mount 16 within 5 µm of reference fiber mount 152 in the Z-direction and removes the Y offset between these mounts. Stage assembly 114 then moves component mount 16 to a −25 µm offset in the X direction. A 50 µm "coarse" scan in the positive X direction is performed next by taking readings from power meter 162 on 1 µm centers. Preferably, the motion is continuous and the X-axis encoder data is used to strobe power meter 162 to report coupled light power on even 1 µm intervals, regardless of velocity variations of stage assembly 114. This mode of collecting power meter data "onthe-fly" allows very fast alignment times. If stage assembly 114 came to a complete stop before each data point was collected, most of the alignment time would be consumed by accelerating and decelerating stage assembly 114 between each data collection location. The data collected by this scan is interpolated by controller 160 to calculate the X position of peak power coupling. Stage assembly 114 then moves to the X position of peak coupling just calculated.

The process then proceeds to block 198 where a coarse Y-axis scan is performed. Stage assembly 114 moves component mount 16 to a −25 µm offset in the Y direction. A 50 µm "coarse" scan in the positive Y direction is then performed taking readings from power meter 162 on 1 µm centers. Preferably, the motion is continuous and the Y-axis encoder data is used to strobe power meter 162 to report coupled light power on even 1 µm intervals, regardless of velocity variations of stage assembly 114. The data collected by this scan is interpolated by controller 160 to calculate the Y position of peak power coupling. Stage assembly 114 then moves to the Y position of peak power coupling just calculated.

The process then proceeds to block 200 where a fine X-axis scan is performed. Stage assembly 114 moves component mount 16 to a −2.5 µm offset in the X direction. A 5.0 µm "fine" scan in the positive X direction is then performed taking readings from power meter 162 on 0.1 µm centers. Preferably, the motion is continuous and the X-axis encoder data is used to strobe power meter 162 to report coupled light power on even 0.1 µm intervals, regardless of velocity variations of stage assembly 114. The data collected by this scan is interpolated by controller 160 to calculate the X position of peak power coupling. Stage assembly 114 then moves to the X position of peak power coupling just calculated.

The process then proceeds to block 202 where a fine Y-axis scan is performed. Stage assembly 114 moves component mount 16 to a −2.5 µm offset in the Y direction. A 5.0 µm "fine" scan in the positive Y direction is then performed taking readings from power meter 162 on 0.1 µm centers. Preferably, the motion is continuous and the Y-axis encoder data is used to strobe power meter 162 to report coupled light power on even 0.1 µm intervals, regardless of velocity variations of stage assembly 114. The data collected by this scan is interpolated by controller 160 to calculate the Y position of peak power coupling. Stage assembly 114 then moves to the Y position of peak power coupling just calculated.

The process then proceeds to block 204 where it is verified that the coupled power from reference fiber 150 to fiber 14 is within acceptable limits. If the coupled power is within acceptable limits the process proceeds to block 216.

In block 216, current source 164 supplies an appropriate current waveform to contact pins 144 to melt solder bonding material 30. When the solder cools, the position of the core of optical fiber 14 with respect to registration features 50 is fixed at the proper alignment position.

The process then proceeds to block 206 to place the mechanical system into the "unload" position. Current probe assemblies 134A and 134B are retracted. Stage assembly 114 moves to the "load/unload" position and optical module loading arm 118 is placed into the "load/unload" position.

The process then proceeds to block 208 to remove the aligned optical module 12. The process then continues by returning to block 192 to load additional optical module pieces.

If, during the verification step of block 204 it is determined that the coupled power from reference fiber 150 to fiber 14 was not within acceptable limits, then the process continues at block 210. Block 210 checks to see if this is the first time an attempt has been made to align this particular component holder 16. If so, then the process goes back to block 196 where the alignment steps are performed again. If the answer to block 210 is no, the process proceeds to block 212.

At block 212 the mechanical system is placed into the "unload" position. Current probe assemblies 134A and 134B are retracted. Stage assembly 114 moves to the "load/unload" position and optical module loading arm 118 is placed into the "load/unload" position. The process then proceeds to block 214 to remove the defective optical module pieces. The process then continues by returning to block 192 to load additional optical module pieces.

To those skilled in the art, it should be appreciated that the alignment method of performing on initial alignment with video cameras and employing "on-the-fly" data collection results in very fast alignment times. Furthermore, it can be appreciated that the alignment methods discussed herein can be readily adapted to other types of optical components. Take the example of aligning a lens to a reference spatial position with respect to registration features 50. Component mount 16 can be adapted to support a lens, such as a GRIN lens, ball lens, microlens, or other lens types. Reference fiber 150 would still be used; however, it would be coupled to power meter 162. A suitable light source such as a collimated laser at the appropriate wavelength would project a beam of light through the lens, although other types of light sources could be used. Stage assembly 114 would manipulate component mount 16 and the lens to focus the light onto reference fiber 150. Stage assembly 114 would scan the lens. Alignment occurs at the position of peak power coupling into the reference fiber. This establishes the focal point of the lens with respect to a reference spatial position.

In a more general aspect, the present invention provides an apparatus for pre-aligning an optical component in an optical module. The apparatus includes a reference base which has some type of registration feature configured to align with a registration feature of the optical module. Any appropriate registration feature can be used which preferably provides accurate and repeatable alignment between two components. An optical sensor is provided to sense an optical characteristic of the optical element. Any appropriate sensor can be used and should be chosen on the particular characteristic which is being observed. The optical characteristic varies in space and the optical sensor provides a sensor output. Some type of optical element manipulator is provided which is configured to move the optical element relative to the registration features of the optical module. A controller operates the optical element manipulator. The controller can be manually controlled or can be controlled through feedback from the optical sensor. Although the specific example device set forth herein is for aligning an optical fiber, the alignment system of the present invention can be used to align any type of optical component that has an optical characteristic that varies based upon the position of the optical component. This can be used for both passive and active devices. The particular type of sensor should be modified accordingly to sense the relevant optical characteristic. As used herein, optical characteristics can be any property or characteristic of a passive or active element which is optical in nature and varies in space (i.e., in one or more degrees of freedom) relative to the component. The sensor may be sensitive to light that has been affected as a function of the optical characterization and this can be used to determine the orientation and positions of the particular characteristic.

Although the present invention has been described with reference to preferred embodiments, workers skilled in the art will recognize that changes may be made in form and detail without departing from the spirit and scope of the invention. For example, other type of registration techniques or configurations can be used as well as other types of manipulators or gripping techniques. The particular steps in aligning the optical module or algorithms used in such alignment can be varied as desired. Other scanning techniques or patterns can be used. In general, the broad aspects of the invention are not limited by the specific examples set forth herein. The optical component can be coupled directly to the relative reference mount without a separate component mount. As used herein, "light" is not necessarily visible light. Further, the optical component can be any active or passive optical, opto-electrical or opto-mechanical element. In some embodiments, the sensor can be an electrical device configured to sense an electrical output from the optical component, for example, in embodiments where the optical component comprises a light sensitive device.

What is claimed is:

1. An apparatus for aligning an optical component in an optical module, comprising:

a reference base having a registration feature configured to align with a registration feature of the optical module;

a sensor configured to respond to an optical characteristic of the optical element, the optical characteristic varying with at least one degree of freedom relative to the registration feature of the optical module, and responsively provide a sensor output;

an optical component manipulator configured to provide relative movement between the optical component and the registration features of the optical module; and wherein the registration features provide substantially kinematic coupling between the reference base and optical module.

2. The apparatus of claim 1 including a controller configured to operate the optical component manipulator.

3. The apparatus of claim 2 wherein the controller operates the optical component manipulator in response to the sensor output.

4. The apparatus of claim 3 wherein the controller actuates the optical component manipulator to align the optical component with a reference.

5. The apparatus of claim 4 wherein the reference is defined with respect to the reference base registration feature.

6. The apparatus of claim 2 wherein the controller is manually operated.

7. The apparatus of claim 1 wherein the optical module includes a relative reference mount which carries the registration feature and the controller is configured to actuate a bonding mechanism to bond the optical component to the relative reference mount.

8. The apparatus of claim 7 wherein the bonding mechanism comprises a heater element configured to melt solder.

9. The apparatus of claim 8 wherein the heater element is carried on the relative reference mount.

10. The apparatus of claim 7 wherein the bonding mechanism comprises a radiation source configured to cure an adhesive material.

11. The apparatus of claim 1 wherein the optical module includes a relative reference mount and the apparatus includes an optical component loading arm configured to place the optical component proximate with the relative reference mount.

12. The apparatus of claim 11 wherein the controller controls operation of the optical component loading arm.

13. The apparatus of claim 1 wherein the optical component manipulator includes a vacuum head configured to selectively attach to the optical component.

14. The apparatus of claim 1 wherein the registration features comprise respective protrusion and depression.

15. The apparatus of claim 1 wherein the sensor is configured to sense light which has interacted with or has been generated by the optical component.

16. The apparatus of claim 15 wherein the sensor provides a fixed reference for aligning a plurality of optical components with respect to the registration feature of the reference base.

17. The apparatus of claim 15 wherein the sensor comprises a reference optical component.

18. The apparatus of claim 1 wherein the sensor comprises electrical circuitry coupled to an electrical output from the optical component, the output related to light received by the optical component.

19. The apparatus of claim 1 including an initial alignment sensor configured to sense initial alignment of the optical component and wherein the sensor provides a fine alignment.

20. The apparatus of claim 19 wherein the initial alignment sensor comprises a camera.

21. The apparatus of claim 20 wherein the initial alignment sensor comprises a plurality of cameras.

22. A method for prealigning an optical module having an optical component and a relative reference mount comprising:
aligning the relative reference mount with registration features of a reference base;
positioning the optical component proximate the relative reference mount;
aligning the optical component with an optical component reference;
coupling the optical component to the relative reference mount when the optical component is aligned with the optical reference to thereby fix the position of the optical component relative to registration features of the relative reference mount to thereby form the optical module;
removing the optical module from the reference base; and
wherein aligning the relative reference mount comprises kinematically coupling the relative reference mount to the reference base.

23. The method of claim 22 wherein coupling the optical component to the relative reference mount includes activating a heater to heat solder.

24. The method of claim 23 wherein the solder fills a gap between the optical component and the relative reference mount.

25. The method of claim 23 wherein activating a heater includes injecting electrical current through an electrical contact on the relative reference mount.

26. The method of claim 22 wherein aligning the optical component with an optical component reference includes observing light that has passed through or been generated by the optical component and the optical component reference and responsively positioning the optical component.

27. The method of claim 22 wherein aligning the optical component includes sensing an electrical output from the optical component generated in response to light received by the optical component.

28. The method of claim 22 wherein placing the optical component proximate the relative reference mount includes observing position of the optical component using at least one camera.

29. The method of claim 22 including loading the optical component in a holder prior to aligning the optical component with the optical component reference.

30. The method of claim 29 including flipping the holder.

31. The method of claim 22 wherein aligning the optical component comprises scanning the optical component through a search pattern relative to the optical component reference.

32. The method of claim 22 wherein the optical component reference is defined relative to the registration features of the reference base.

33. An apparatus for aligning an optical component in an optical module, comprising:
a reference base having a registration feature configured to align with a registration feature of the optical module;
a sensor configured to respond to an optical characteristic of the optical element, the optical characteristic varying with at least one degree of freedom relative to the registration feature of the optical module, and responsively provide a sensor output;
an optical component manipulator configured to provide relative movement between the optical component and the registration features of the optical module;
wherein the registration features comprise protrusion and depression.

34. The apparatus of claim 33 including a controller configured to operate the optical component manipulator.

35. The apparatus of claim 34 wherein the controller operates the optical component manipulator in response to the sensor output.

36. The apparatus of claim 35 wherein the controller actuates the optical component manipulator to align the optical component with a reference.

37. The apparatus of claim 36 wherein the reference is defined with respect to the reference base registration feature.

38. The apparatus of claim 35 wherein the controller is manually operated.

39. The apparatus of claim 33 wherein the optical module includes a relative reference mount which carries the registration feature and the controller is configured to actuate a bonding mechanism to bond the optical component to the relative reference mount.

40. The apparatus of claim 33 wherein the optical module includes a relative reference mount and the apparatus includes an optical component loading arm configured to place the optical component proximate with the relative reference mount.

41. The apparatus of claim 33 wherein the sensor is configured to sense light which has interacted with or has been generated by the optical component.

42. The apparatus of claim 33 including an initial alignment sensor configured to sense initial alignment of the optical component and wherein the sensor provides a fine alignment.

43. A method for prealigning an optical module having an optical component and a relative reference mount comprising:

aligning the relative reference mount with registration features of a reference base;

positioning the optical component proximate the relative reference mount;

aligning the optical component with an optical component reference;

coupling the optical component to the relative reference mount when the optical component is aligned with the optical reference to thereby fix the position of the optical component relative to registration features of the relative reference mount to thereby form the optical module;

removing the optical module from the reference base; and wherein coupling the optical component to the relative reference mount includes activating a heater to heat solder.

44. A method for prealigning an optical module having an optical component and a relative reference mount comprising:

aligning the relative reference mount with registration features of a reference base;

positioning the optical component proximate the relative reference mount;

aligning the optical component with an optical component reference;

coupling the optical component to the relative reference mount when the optical component is aligned with the optical reference to thereby fix the position of the optical component relative to registration features of the relative reference mount to thereby form the optical module;

removing the optical module from the reference base;

loading the optical component in a holder prior to aligning the optical component with the optical component reference; and flipping the holder.

45. An apparatus for aligning an optical component in an optical module, comprising:

a reference base having a registration feature configured to align with a registration feature of the optical module;

a sensor configured to respond to an optical characteristic of the optical element, the optical characteristic varying with at least one degree of freedom relative to the registration feature of the optical module, and responsively provide a sensor output;

an optical component manipulator configured to provide relative movement between the optical component and the registration features of the optical module; and wherein the optical component manipulator includes a vacuum head configured to selectively attach to the optical component.

* * * * *

UNITED STATES PATENT AND TRADEMARK OFFICE
CERTIFICATE OF CORRECTION

PATENT NO. : 6,590,658 B2
DATED : July 8, 2003
INVENTOR(S) : Steven K. Case et al.

It is certified that error appears in the above-identified patent and that said Letters Patent is hereby corrected as shown below:

Title page,
Item [56], References Cited, U.S. PATENT DOCUMENTS, insert
--

| | | | |
|---|---|---|---|
| 4,250,520 | 2/1981 | Denlinger | 357  68 |
| 4,457,467 | 7/1984 | Klement et al. | 228/103 |
| 4,708,429 | 1119/87 | Clark et al. | 350/96.20 |
| 4,750,799 | 6/1988 | Kawachi et al. | 350/96.11 |
| 4,752,816 | 6/1988 | Sussman et al. | 357/30 |
| 4,798,439 | 1/1989 | Preston | 350/96.20 |
| 4,892,377 | 1/1990 | Randle | 350/96.2 |
| 4,954,458 | 9/1990 | Reid | 437/51 |
| 4,989,934 | 2/1991 | Zavracky et al. | 350/96.11 |
| 5,113,404 | 5/1992 | Gaebe et al. | 372/36 |
| 5,123,074 | 6/1992 | Yokota et al. | 385/95 |
| 5,177,807 | 1/1993 | Avelange et al. | 385/91 |
| 5,210,811 | 5/1993 | Avelange et al. | 385/91 |
| 5,247,597 | 9/1993 | Blacha et al. | 385/88 |
| 5,249,733 | 10/1993 | Brady et al. | 228/180.22 |
| 5,283,446 | 2/1994 | Tanisawa | 357/433 |
| 5,478,778 | 12/1995 | Tanisawa | 437/183 |
| 5,499,312 | 3/1996 | Hahn et al. | 385/91 |
| 5,535,296 | 7/1996 | Uchida | 385/89 |
| 5,550,088 | 8/1996 | Dautartas et al. | 437/225 |
| 5,555,333 | 9/1996 | Kato | 385/89 |
| 5,559,914 | 9/1996 | Asakura | 385/49 |
| 5,568,892 | 10/1996 | Basavanhally | 228/180.22 |
| 5,574,561 | 11/1996 | Boudreau et al. | 356/399 |
| 5,603,870 | 2/1997 | Roll et al. | 264/1.25 |
| 5,647,044 | 7/1997 | Basavanhally et al. | 385/92 |
| 5,659,641 | 8/1997 | DeMeritt et al. | 385/14 |
| 5,687,267 | 11/1997 | Uchida | 385/89 |
| 5,700,987 | 12/1997 | Basavanhally | 219/56.1 |
| 5,721,797 | 2/1998 | Basavanhally et al. | 385/49 |
| 5,748,822 | 5/1998 | Miura et al. | 385/90 |
| 5,748,827 | 5/1998 | Holl et al. | 385/134 |
| 5,778,120 | 7/1998 | Asakura et al. | 385/49 |
| 5,833,202 | 11/1998 | Wolfgang | 248/466 |
| 5,854,867 | 12/1998 | Lee et al. | 385/49 |
| 5,859,943 | 1/1999 | Asakura et al. | 385/49 |
| 5,883,988 | 3/1999 | Yamamoto et al. | 385/14 |
| 5,892,179 | 4/1999 | Rinne et al. | 174/261 |
| 5,985,086 | 11/1999 | Peall | 156/292 |
| 5,898,806 | 4/1999 | Nishimoto | 385/49 |
| 5,907,649 | 5/1999 | Acklin et al. | 385/49 |
| 5,966,486 | 10/1999 | Boudreau et al. | 385/90 |
| 5,970,200 | 10/1999 | Takikawa et al. | 385/137 |
| 5,985,086 | 11/1999 | Peall | 156/292 |
| 6,027,253 | 2/2000 | Ota et al. | 385/83 |
| 6,027,254 | 2/2000 | Yamada et al. | 385/88 |
| 6,058,234 | 5/2000 | Tachigori | 385/49 |
| 6,106,161 | 8/2000 | Basavanhally et al. | 385/88 |
| 6,112,001 | 8/2000 | Kishida et al. | 385/49 |
| 6,115,515 | 9/2000 | Itoh et al. | 385/14 |
| 6,118,917 | 9/2000 | Lee et al. | 385/49 |
| 6,130,448 | 10/2000 | Bauer et al. | 257/222 |
| 6,132,106 | 10/2000 | Yokoyama | 385/74 |
| 6,151,173 | 11/2000 | Massit et al. | 359/811 |
| 6,157,050 | 12/2000 | Fukuoka | 257/82 |
| 6,160,936 | 12/2000 | You et al. | 385/49 |
| 5,644,668 | 7/1997 | Chambers et al. | 385/90 |
| 5,671,315 | 9/1997 | Tabuchi et al. | 385/137 |
| 5,700,987 | 12/1997 | Basavanhally | 219/56.1 |
| 6,074,103 | 6/2000 | Hargreaves et al. | 385/90 |
| 6,106,161 | 8/2000 | Basavanhally et al. | 385/88 |
| 6,222,579 | 4/2001 | Sousa | 347/241 |
| 6,327,407 | 12/2001 | Mitsuda et al. | 385/49 |
| 2001/0010743 | 8/2001 | Cayrefoureq et al. | 385/88 |

Page 1 of 3

UNITED STATES PATENT AND TRADEMARK OFFICE
CERTIFICATE OF CORRECTION

PATENT NO. : 6,590,658 B2  
DATED : July 8, 2003  
INVENTOR(S) : Steven K. Case et al.

Page 2 of 3

It is certified that error appears in the above-identified patent and that said Letters Patent is hereby corrected as shown below:

Title page (cont'd),

```
4,730,198    3/1988     Brown et al.         350/96.20
4,790,618    12/1988    Abe                  350/96.15
4,817,849    4/1989     Yamamoto et al.      228/103
4,845,052    7/1989     Abend                437/209
4,909,590    3/1990     Kamiko et al.        350/96.22
5,093,879    3/1992     Bregman et al.       385/93
5,170,455    12/1992    Gooseen et al.       385/89
5,215,489    6/1993     Nakamura             445/4
5,322,463    6/1994     Young                445/4
5,371,822    12/1994    Horwitz et al.       385/89
5,625,733    4/1997     Frigo et al.         385/88
5,659,641    8/1997     DeMeritt et al.      385/14
5,737,467    4/1998     Kato et al.          385/92
5,916,458    6/1999     Komoriya et al.      219/121.63
6,010,251    1/2000     Koyanagi et al.      385/93--
```

FOREIGN PATENT DOCUMENTS, insert

```
-- 0 840 154 A1   5/1998      EPO
   0 977 061 A2   2/2000      EPO
   2 779 536      12/1999     France
   54-12286       1/1979      Japan
   63-193113      8/1988      Japan
   61-277908      12/1996     Japan
   62-276890      12/1987     Japan
   63-12187       1/1988      Japan
   63-65411       3/1988      Japan
   63-193113      8/1988      Japan
   63-228113      9/1988      Japan
   1-302214       12/1989     Japan
   6-34852        2/1994      Japan
   6-174943       6/1994      Japan
   6-201921       7/1994      Japan
   6-331840       12/1994     Japan
   7-333472       12/1995     Japan    --
   196 44 758 A1  4/1998      Germany
```

UNITED STATES PATENT AND TRADEMARK OFFICE
CERTIFICATE OF CORRECTION

PATENT NO. : 6,590,658 B2
DATED : July 8, 2003
INVENTOR(S) : Steven K. Case et al.

It is certified that error appears in the above-identified patent and that said Letters Patent is hereby corrected as shown below:

<u>Title page (cont'd)</u>,
OTHER PUBLICATIONS, insert

```
"Micro-Mechanical Alignment Structures (patent pending)", from Web Site of Axsun
Technologies, 2 pages, downloaded 2/15/01.

"An Innovative Flexible and Accurate Packaging Technique Suited to Fabricate Low
Cost Micro Optoelectronic Modules", by M. Scussat et al., Electronic Components
and Technology Conference, 2000, pgs. 26-32.--
```

Signed and Sealed this

Seventh Day of September, 2004

JON W. DUDAS
*Director of the United States Patent and Trademark Office*